United States Patent [19]

Martinek et al.

[11] 4,320,558

[45] Mar. 23, 1982

[54] CONTINUOUS SHIRRING AND SPINNING MACHINE FOR CASINGS

[75] Inventors: Harold H. Martinek, Danville, Ill.; Thomas W. Martinek, Covington, Ind.; Alfred D. Story, Danville, Ill.

[73] Assignee: Teepak, Inc., Chicago, Ill.

[21] Appl. No.: 147,887

[22] Filed: May 8, 1980

[51] Int. Cl.³ .............................................. A22C 13/02
[52] U.S. Cl. .......................................... 17/42; 53/576; 53/581
[58] Field of Search ................. 17/41, 42, 49; 53/576, 53/581

[56] References Cited

U.S. PATENT DOCUMENTS

| | | | |
|---|---|---|---|
| 3,112,516 | 12/1963 | Bonnee | 17/42 |
| 3,209,398 | 10/1965 | Ziolko | 17/42 |
| 3,454,981 | 7/1969 | Martinek | 17/42 |

Primary Examiner—Willie G. Abercrombie
Attorney, Agent, or Firm—Charles E. Brown

[57] ABSTRACT

This relates to a machine for shirring tubular films such as those used for sausage casings and the like. In accordance with this disclosure, the films are continuously fed onto a mandrel where they are opened from their flat state and then are fed at a selected rate through a shirring head. The shirred casing is then gripped and advanced in a manner so as to control the density thereof and to impart a spin thereto as desired. The shirred casing, while being spun, is gripped by a pair of cooperating units and a leading portion of the shirred casing is separated at predetermined spacings into individual strands which are then fed along the mandrel individually and are compressed and doffed from the mandrel into a strand handler which then presents each strand to an end closer and thereafter deposits the closed strand on a receiving tray.

9 Claims, 54 Drawing Figures

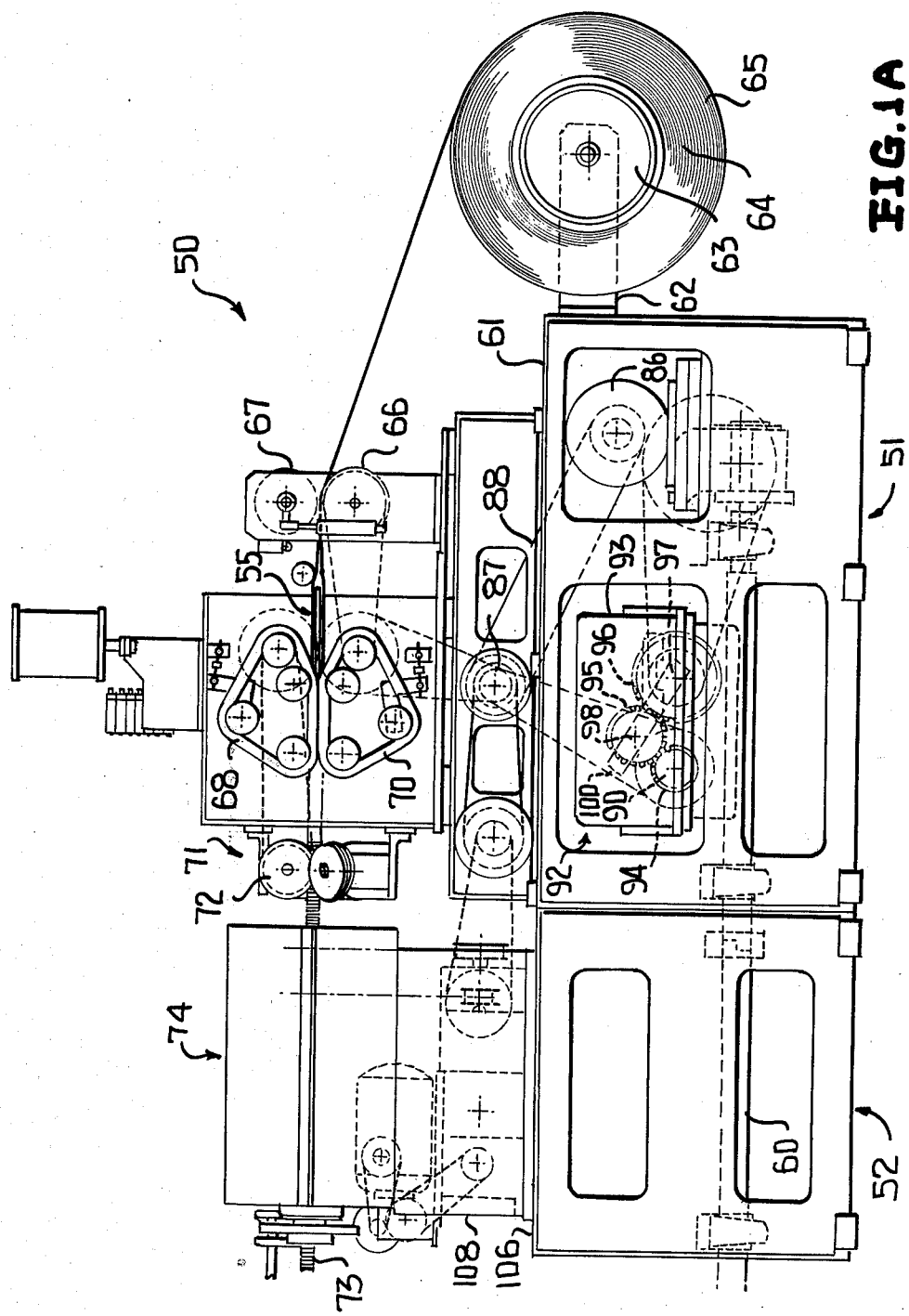

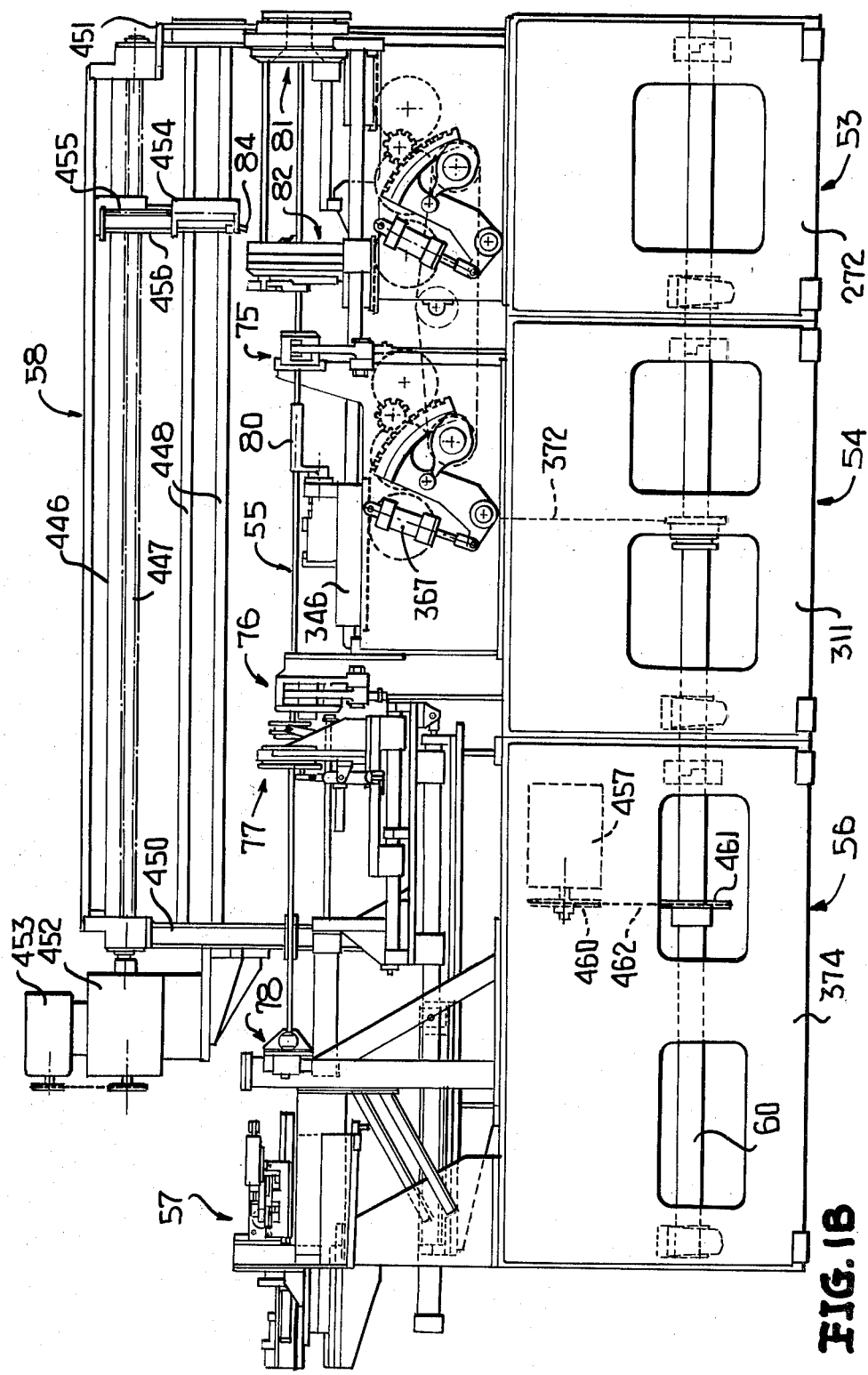

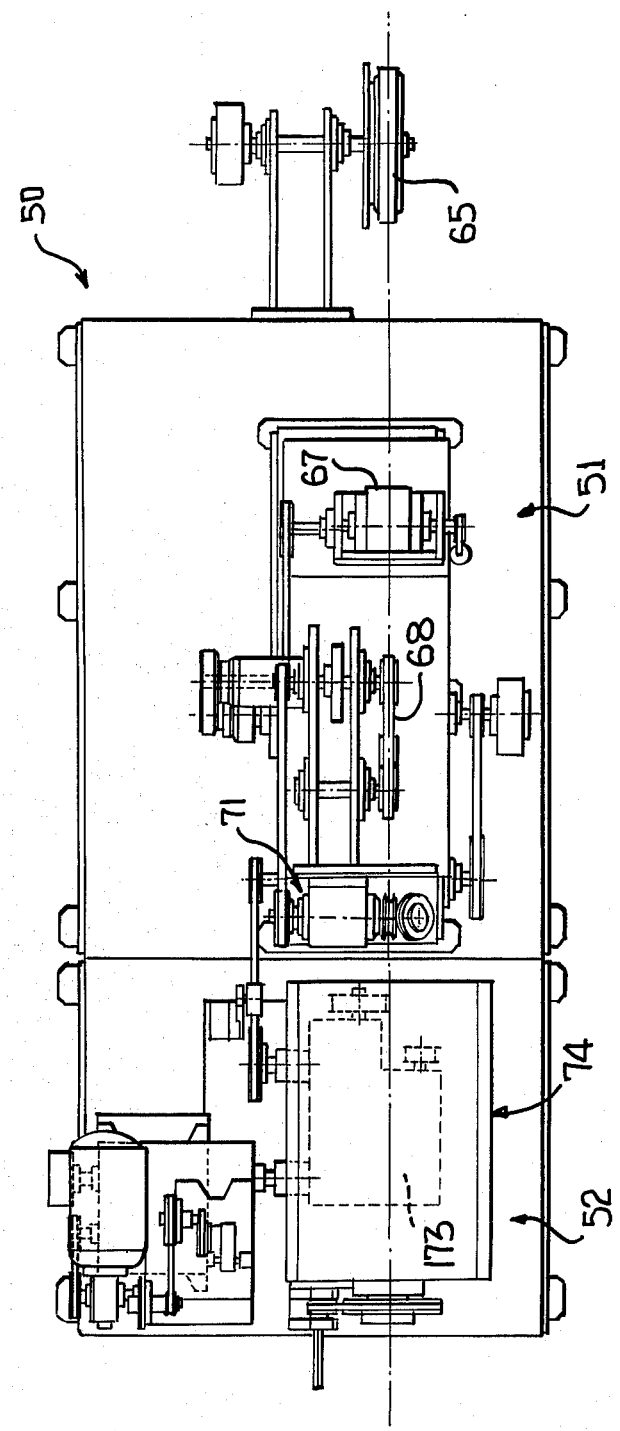

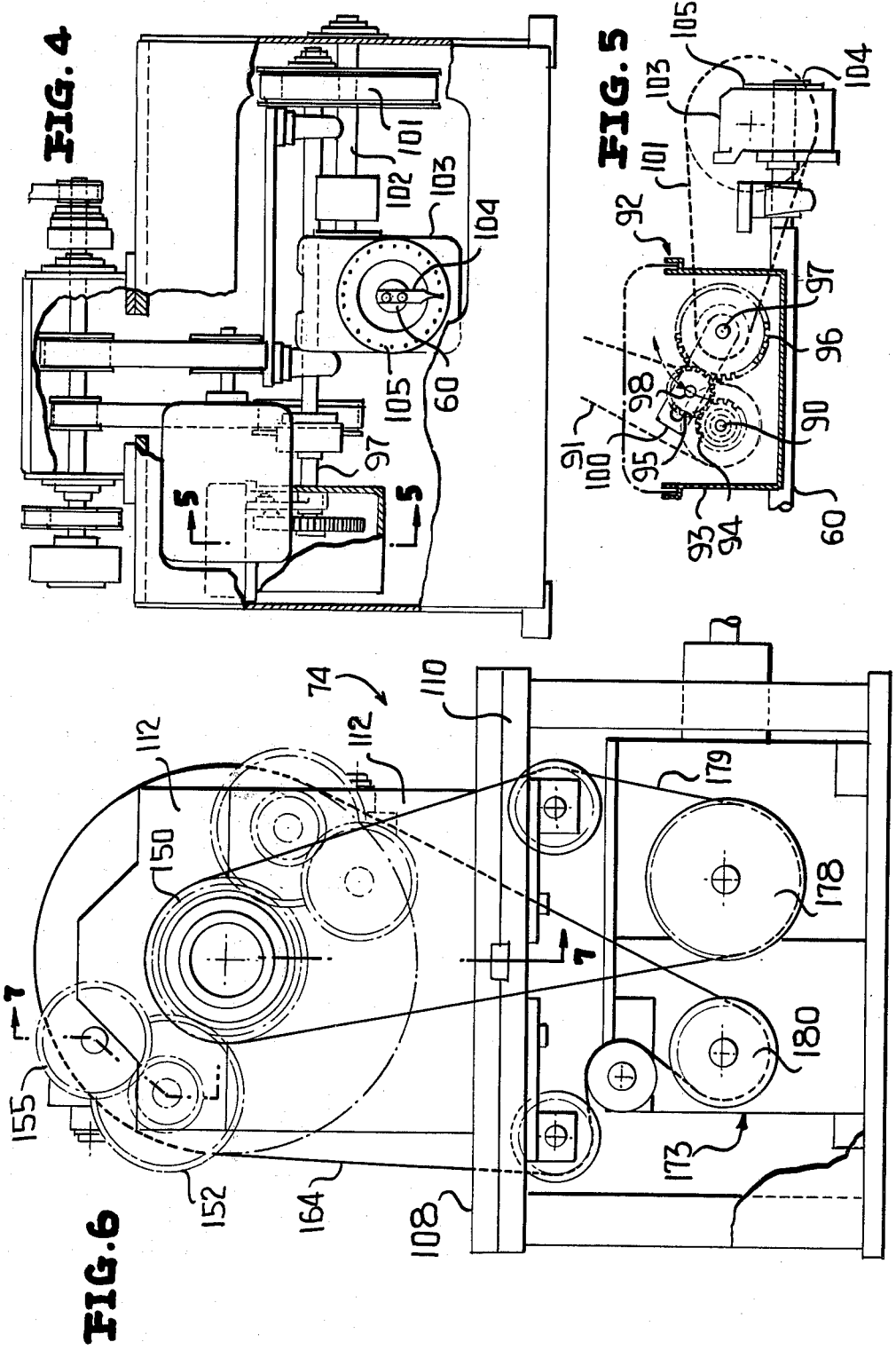

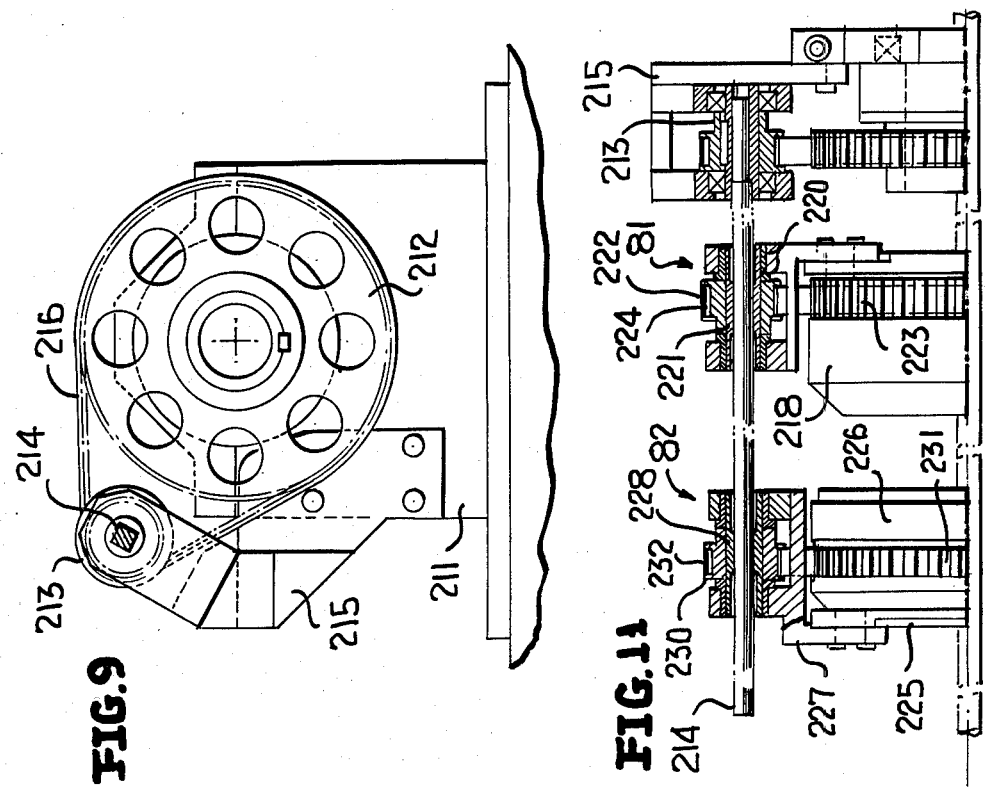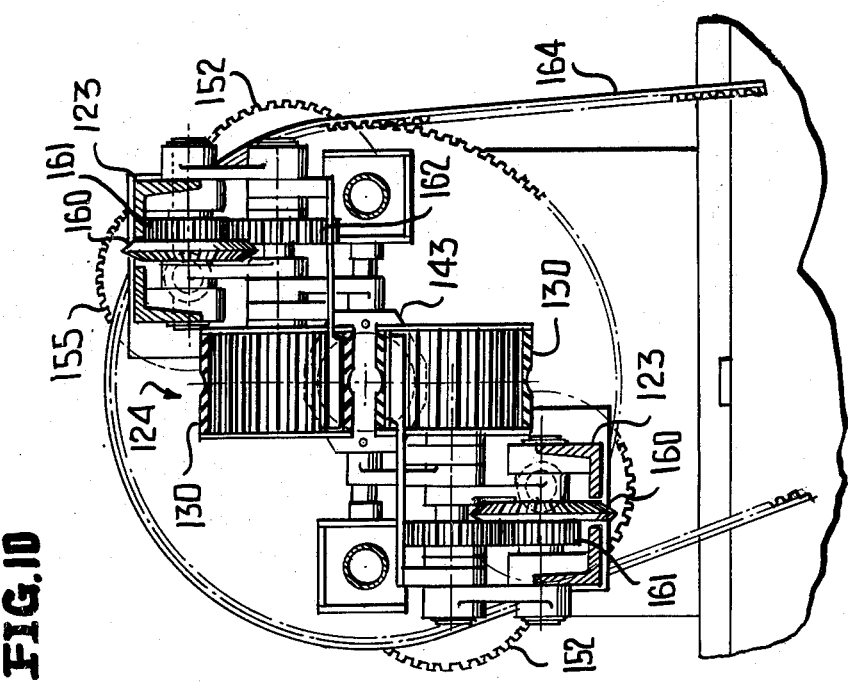

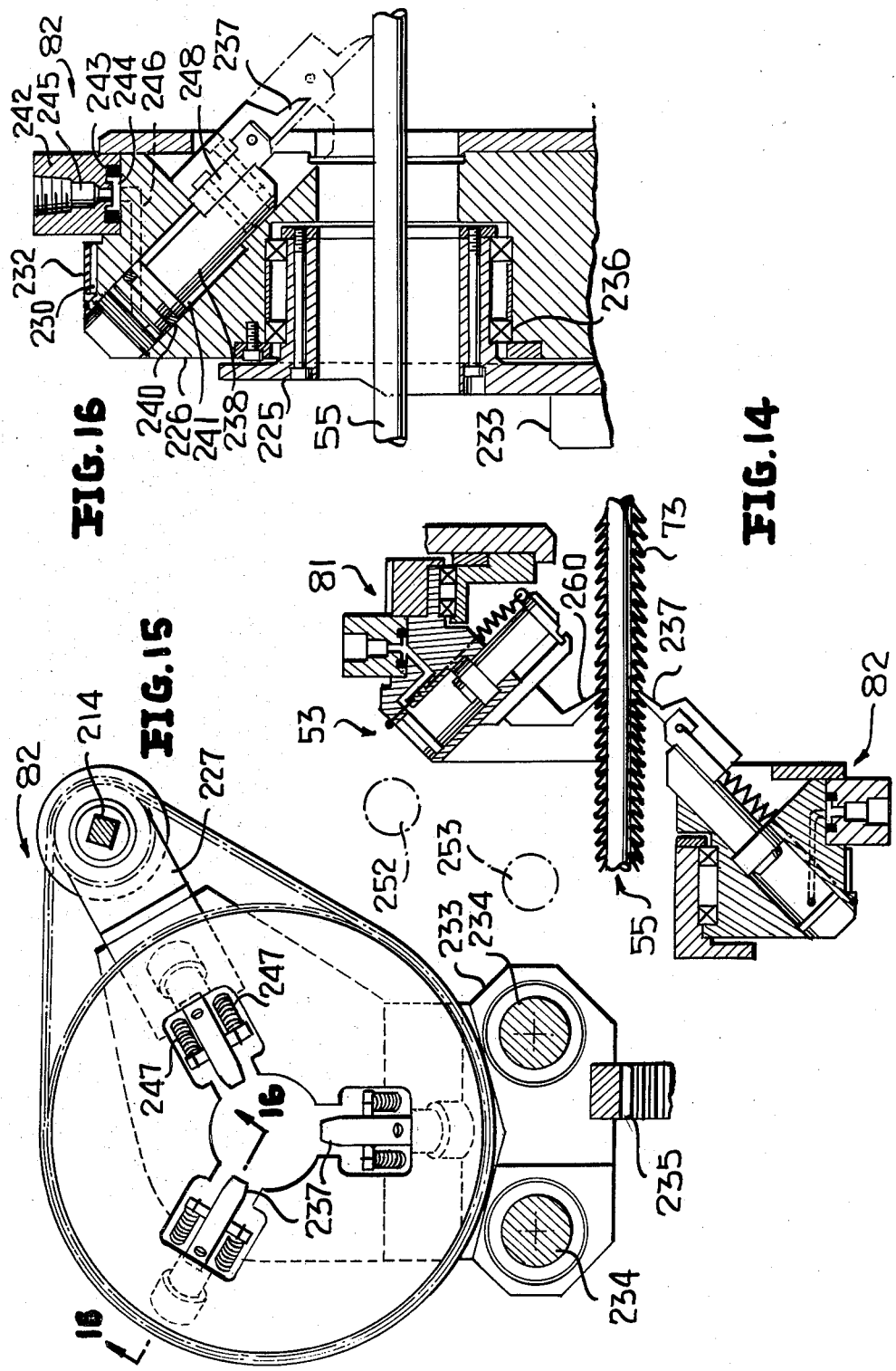

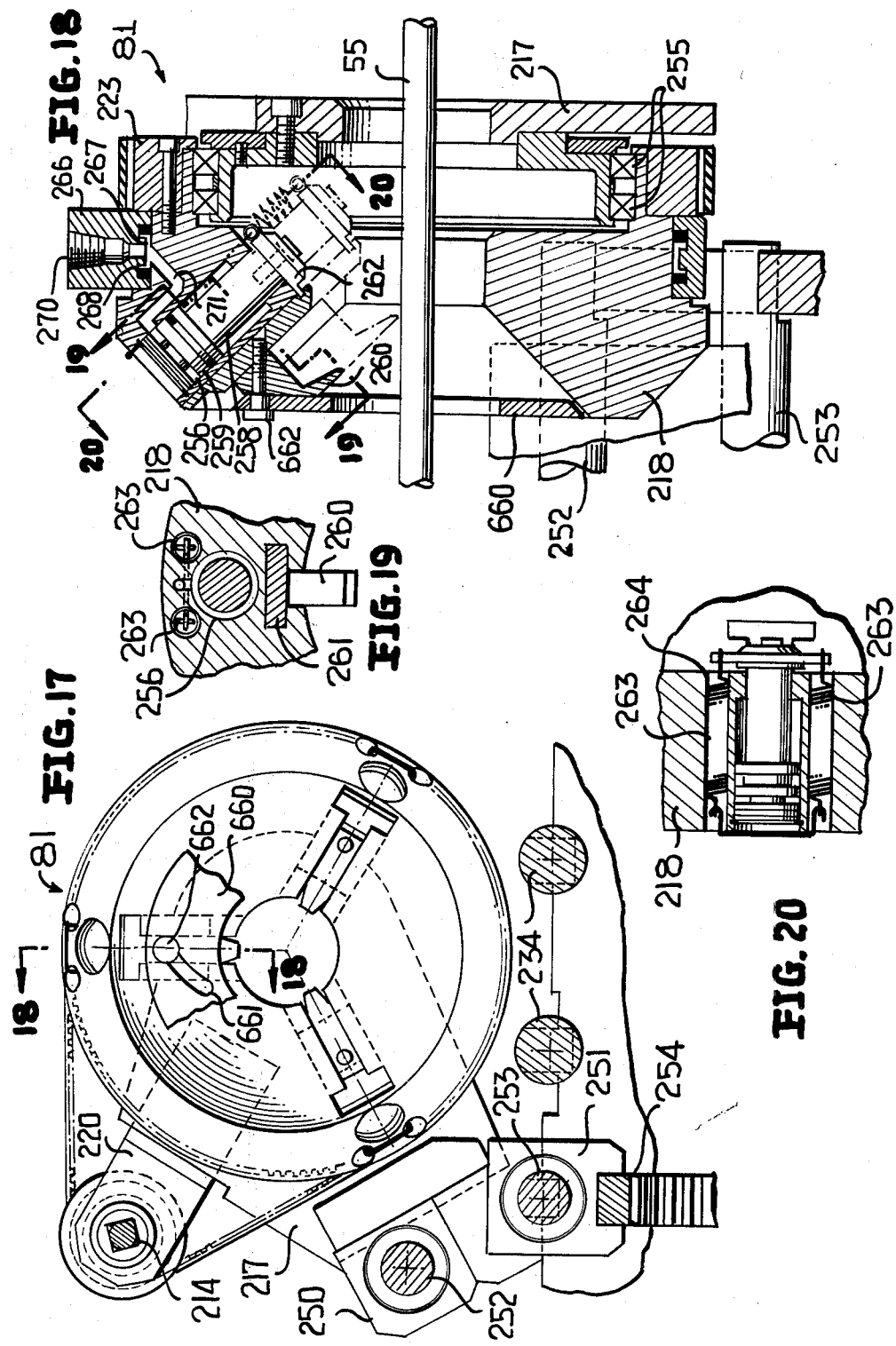

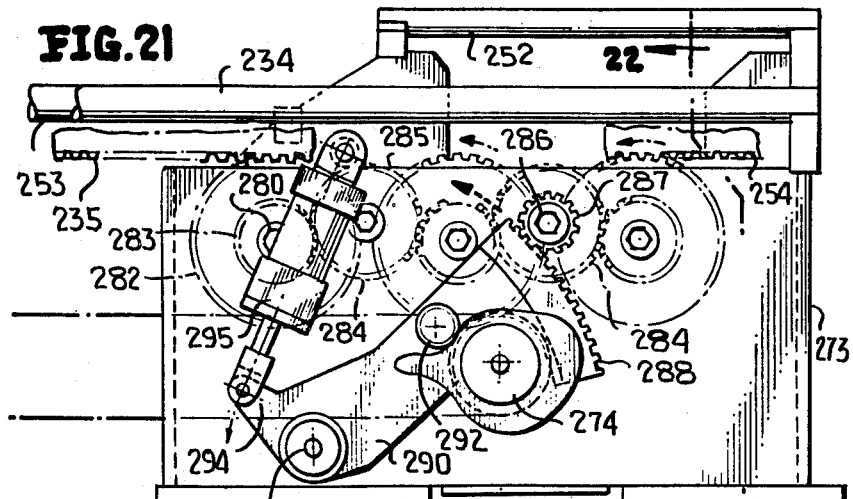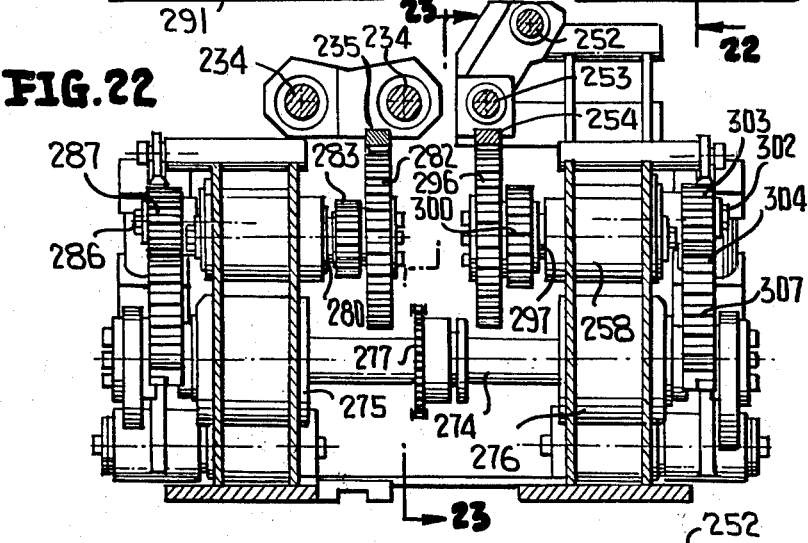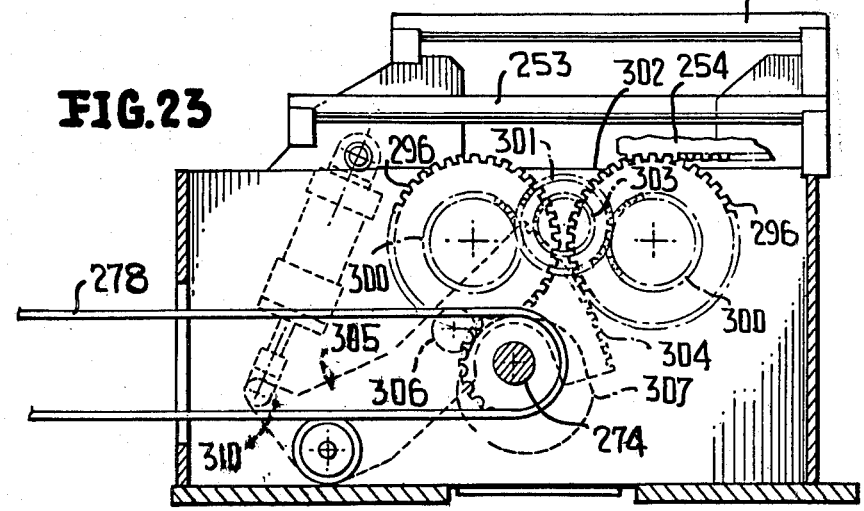

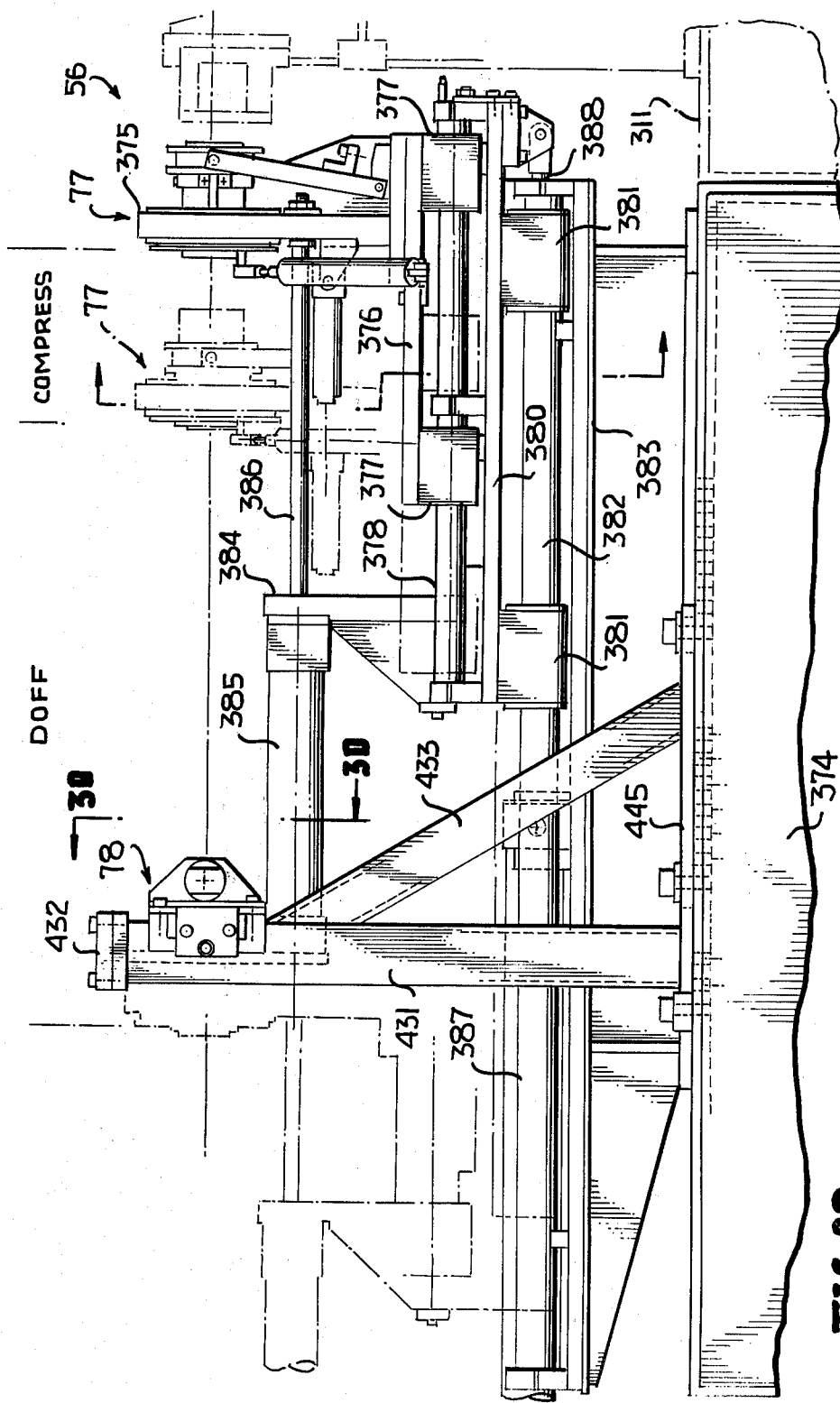

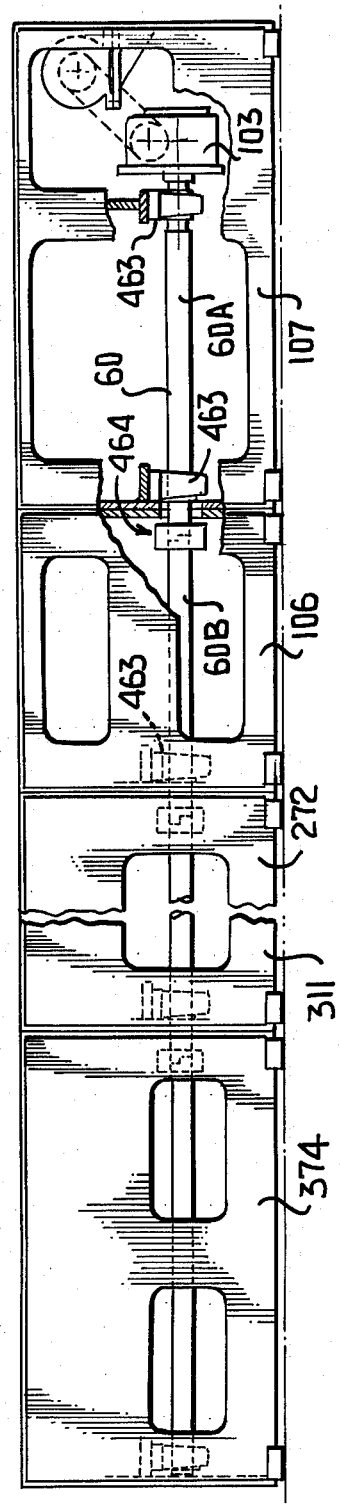
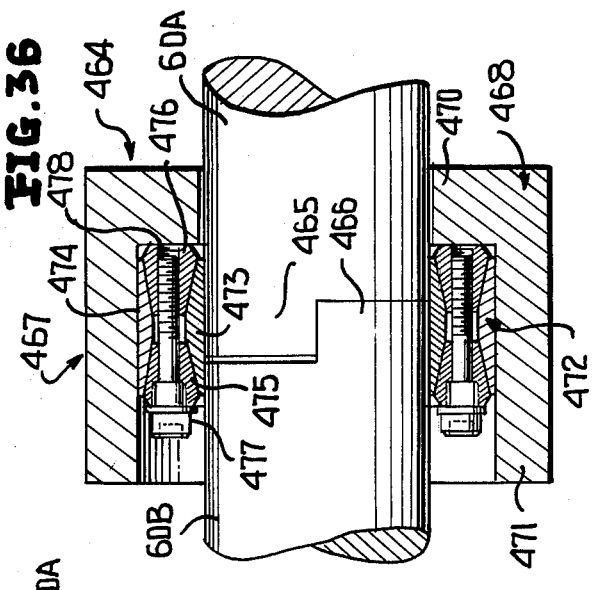
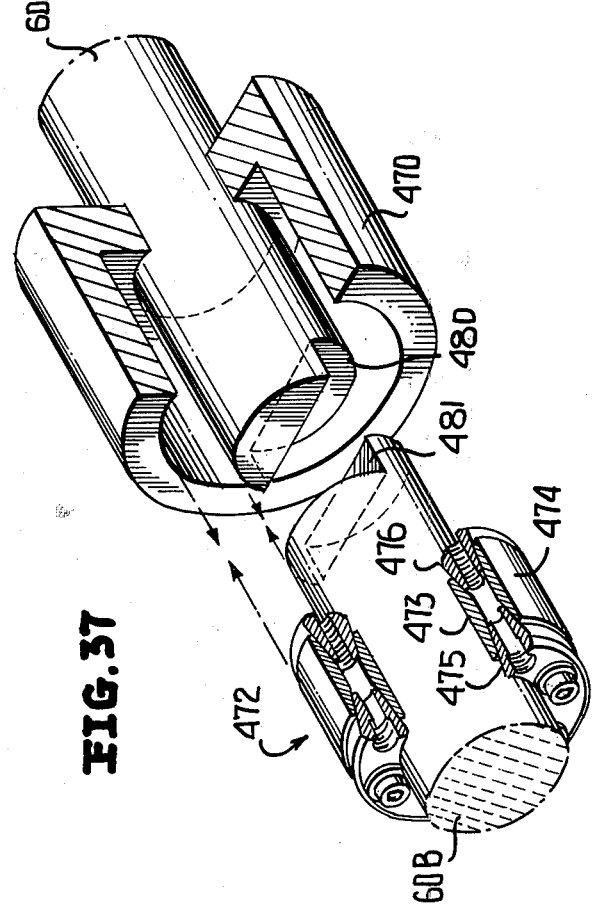
FIG. 35
FIG. 36
FIG. 37

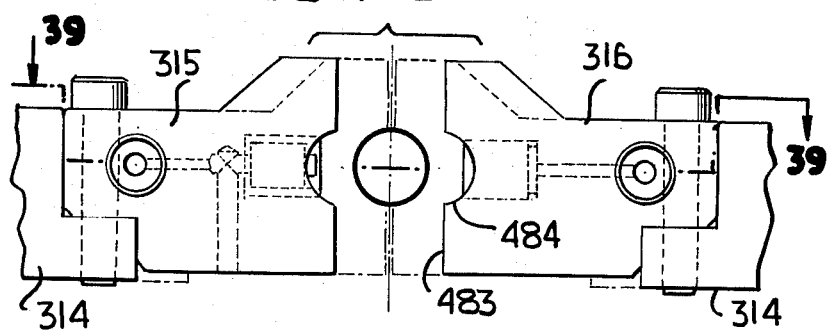
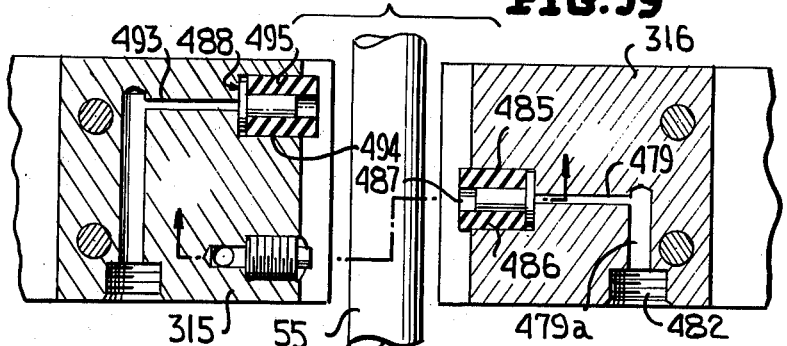
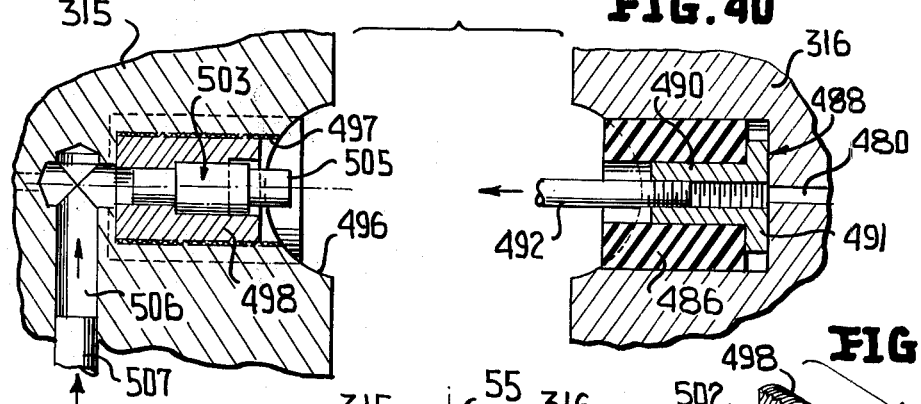
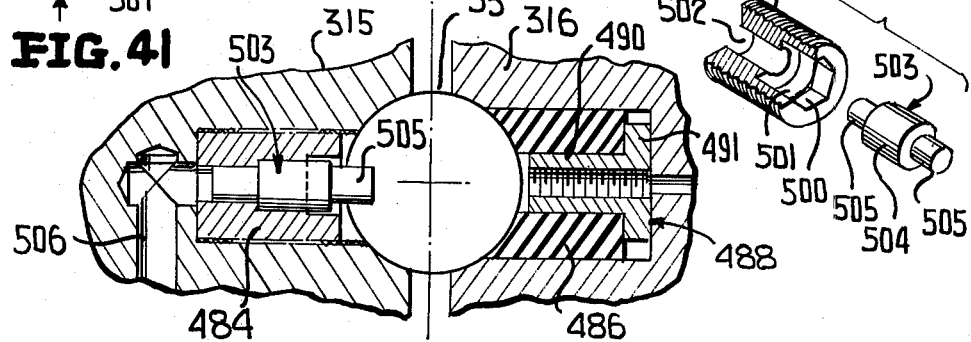

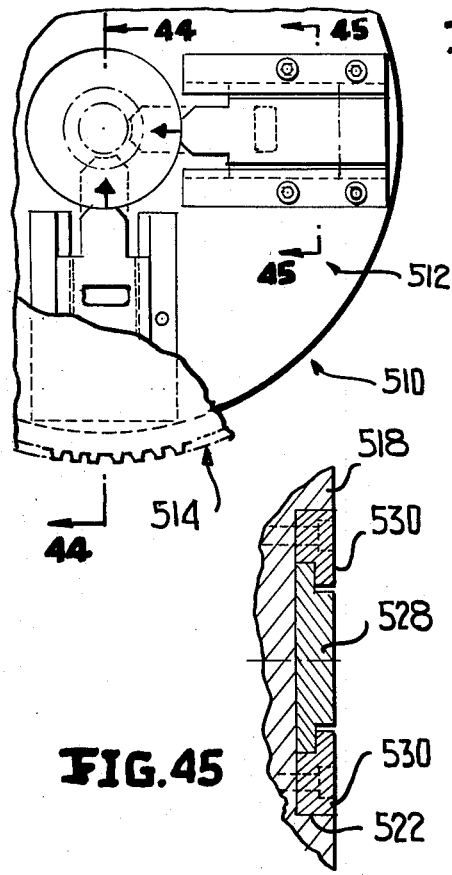
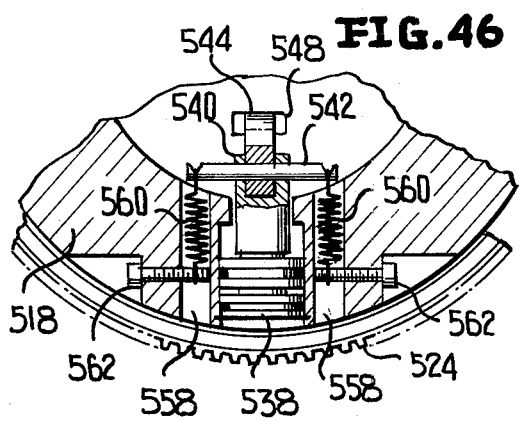
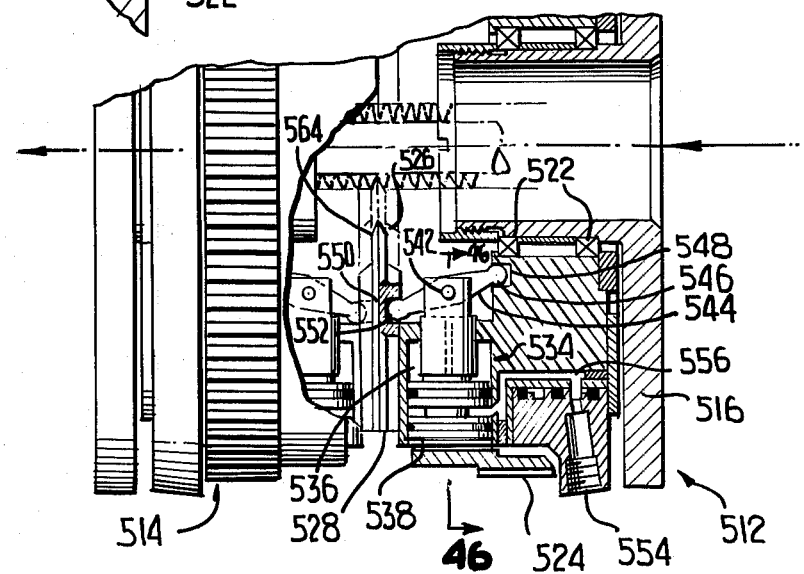

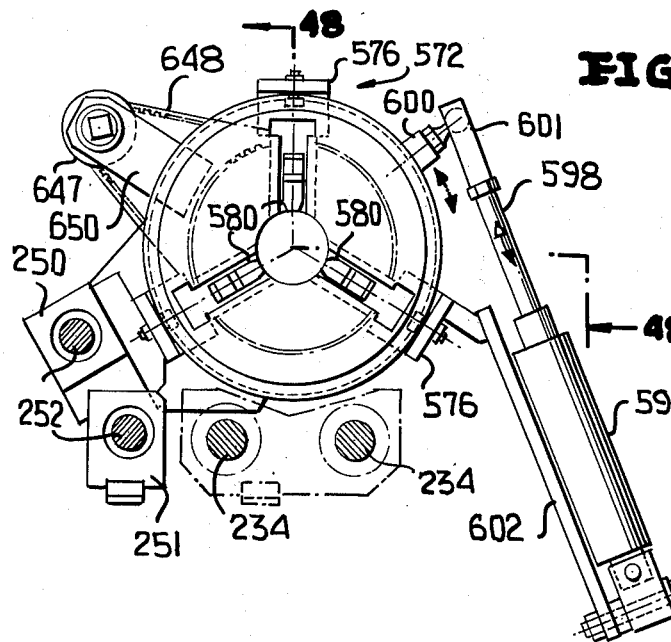
FIG. 47
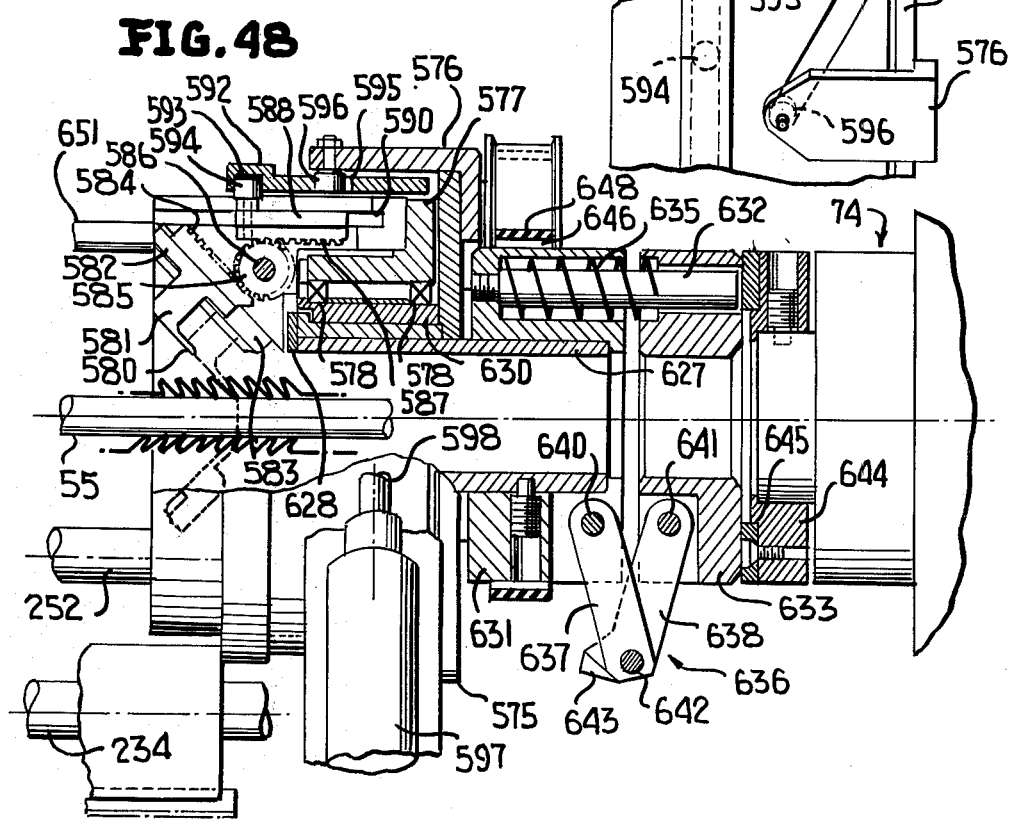
FIG. 48
FIG. 49

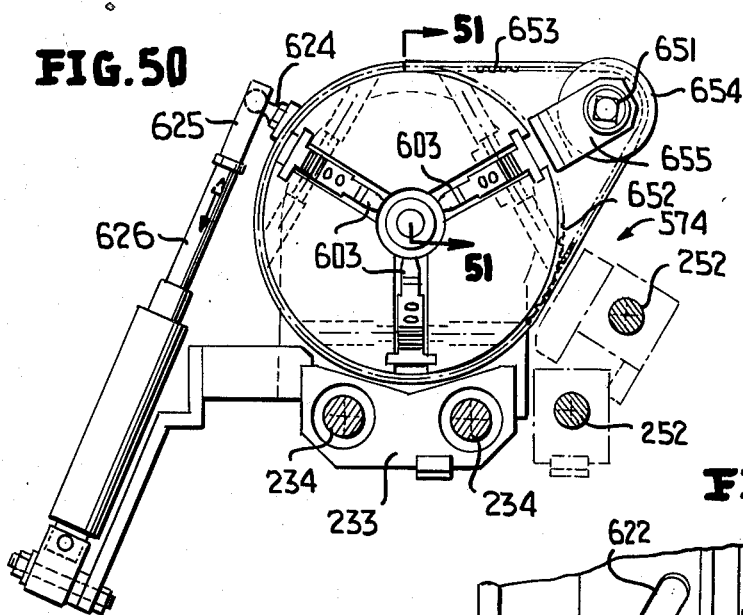
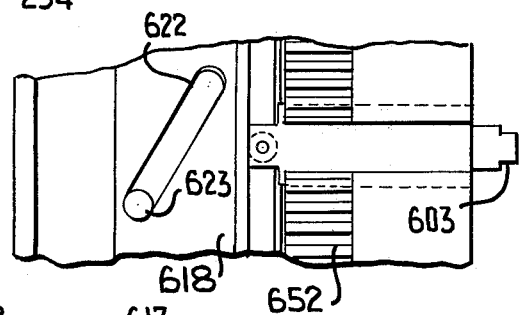
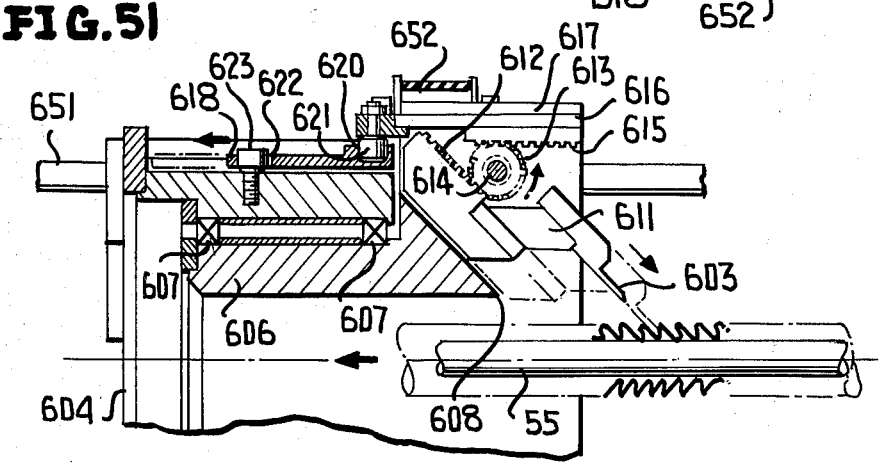

CONTINUOUS SHIRRING AND SPINNING MACHINE FOR CASINGS

This invention relates in general to new and useful improvements in casing shirring machines for shirring casings for sausages and the like, and more particularly to a shirring machine which is capable of continuously shirring a casing while at the same time spinning the casing.

It is known continuously to shirr casings. However, it has been found that it is desirable also to spin such casings as they are being continuously shirred. The spinning of such casings is generally necessitated by the fact that if there any any irregularities in either the wall thickness of the casing or in the spinning operation, the resultant shirred casing will have a bow, and accordingly straight casing sticks or strands cannot be obtained.

In accordance with this invention it is proposed to shirr a casing in a conventional manner and then to control the density of the shirred casing by a suitable hold back mechanism which also, at the same time, imparts to the shirred casing the desired spin.

Also, in accordance with this invention it is proposed to provide an apparatus for segregating the shirred casing into strands of preselected lengths, and to provide an apparatus for effecting such segregation which will be spun as it effects the segregation at the same rate as the casing.

More specifically, in accordance with this invention it is proposed to provide a combination shirred casing hold back device and spinning apparatus which will simultaneously control the density of the shirred casing and impart thereto the necessary spin. In conjunction with the hold back device, there is provided a device for separating the shirred casing into individual strands, and this device is coupled to the spinning apparatus for spinning in unison therewith.

In accordance with this invention it is proposed to provide a hold back device in the form of a pair of endless belts having opposed runs which will grip the shirred casing and control the advance thereof. It is also proposed to so mount the two belt conveyors within a support which may be rotated about the axis of the shirred casing to impart a controlled spin to the shirred casing.

It is also proposed to provide a drive arrangement for separately effecting the driving of the belt conveyors and the spinning of the belt conveyor unit with a change in the spinning rate or direction in no way affecting the rate of movement of the belt conveyors.

Another feature of the invention is the provision of a device for separating a shirred casing into individual strands, which device includes a hold back unit and a separator unit which are provided with separately actuatable grippers. The grippers of the hold back unit will grip an intermediate portion of a shirred casing and restrain it against forward movement while the grippers of the separator unit will grip that same shirred casing immediately adjacent the grippers of the hold back unit, and then will rapidly advance away from the hold back unit so as to separate the shirred casing by tearing, and to advance the separated strand for further transport.

The hold back unit is also operable to function in conjunction with the density control device to prevent undesired axial expansion of the shirred casing.

Another feature of the invention is the provision of a rack and pinion drive which may be utilized with the casing separator individually to advance and retract the hold back unit and the separator unit. The drive includes a plurality of pinions and a rack sequentially engageable with the pinions to that the rack may have a travel in excess of its length. The pinions are preferably driven by means of a cam follower engaging a rotating cam of a configuration to provide the desired timing and direction of movement of the rack.

In accordance with this invention there may also be a supplemental hold back device which will be sequentially placed in front of the advancing shirred casing and which will prevent an undue axial expansion of the casing when it is released by the hold back unit.

There is also provided a device for receiving a separated shirred strand and first axially compressing the shirred strand to a length which is shorter than that provided by the density control device and which is also operable to doff the compressed strand.

The device for compressing and doffing a separated strand also includes a head which is engageable with the trailing end of a strand being compressed and which may be oscillated and or rotated so as to smooth the torn trailing end of the separated strand.

The machine is also provided with known strand handling means for receiving a doffed strand, presenting the doffed strand to an end closer, and then depositing the closed strand on a suitable receptacle tray.

A suitable transporting device is provided for transporting a separated strand along the mandrel through pairs of openable mandrel supports or clamps to the device for compressing and doffing the strand. The transporter includes a finger which is vertically movable relative to a carrier for engaging over the mandrel behind a separated strand to effect the necessary movement.

Another feature of the machine is the provision of a quick change gear unit and an adjustable drive connection between a primary drive unit and a main shaft of the machine whereby the machine may be adjusted to shirr different lengths of casings into a single strand with a minimum of down time and adjustment, or more specifically to form different strand lengths.

It is also proposed to form the machine in modules with each machine having a control shaft segment and there being provided a novel connector for the control shaft segment which assures angular alignment of adjacent shaft portions.

There has also been provided novel means on the mandrel support wherein tubular resilient seals between the mandrel support and the mandrel are prevented from closing under compression and restricting flow, and at the same time the seals may be readily replaced. There are also provided means for facilitating the accurate mounting of mandrel rotation and axial shifting pins and means for facilitating ease of replacement of such pins.

With the above and other objects in view that will hereinafter appear, the nature of the invention will be more clearly understood by reference to the following detailed description, the appended claims, and the several views illustrated in the accompanying drawings.

IN THE DRAWINGS

FIGS. 1A and 1B are side elevational views of the continuous casing shirring machine showing the general details thereof.

FIGS. 2A and 2B are plan views of the machine corresponding to FIGS. 1A and 1B, respectively.

FIG. 4 is an enlarged fragmentary end view, with parts broken away and shown in section, of the forward end of the machine and shows various details of the timing mechanism.

FIG. 5 is a schematic view showing details of a quick change drive assembly.

FIG. 6 is an enlarged end view of the device for holding back the shirred casing and controlling the density thereof.

FIG. 9 is an end elevational view of the density control device taken generally along the line 9—9 of FIG. 7.

FIG. 10 is a transverse sectional view taken generally along the line 10—10 of FIG. 7, and shows specifically the details of the density control device, the usual mandrel and shirred casing having been omitted for purposes of clarity.

FIG. 11 is a fragmentary plan view showing the manner in which a drive from the density control device is utilized to drive a strand separator.

FIG. 14 is a schematic fragmentary sectional view taken through the strand separator, and shows the relative positions of a hold back unit and a separator unit.

FIG. 15 is an enlarged end elevational view of the separator unit.

FIG. 16 is an enlarged fragmentary sectional view taken generally along the line 16—16 of FIG. 15, and shows the details of the mounting of one of the fingers of the separator unit.

FIG. 17 is an end elevational view of a hold back unit.

FIG. 18 is an enlarged fragmentary sectional view taken generally along the line 18—18 of FIG. 17, and shows the details of the mounting of one of the hold back fingers of the hold back unit.

FIG. 19 is a fragmentary sectional view taken generally along the line 19—19 of FIG. 18, and shows generally the details of the mounting of the finger and the piston for positioning the same.

FIG. 20 is a sectional view taken generally along the line 20—20 of FIG. 18, and shows further the details of the means for positioning the finger.

FIG. 21 is a side elevational view of the base portion of the strand separator and shows the details of the drive mechanism for reciprocating the separator unit and the hold back unit in sequence.

FIG. 22 is a transverse vertical sectional view taken generally along the line 22—22 of FIG. 21, and shows more specifically the details of the drive.

FIG. 23 is a longitudinal vertical sectional view taken along the line 23—23 of FIG. 22, and shows the specific details of the drive for the hold back unit.

FIG. 28 is an enlarged side elevational view of a combination strand compressor and doffer, and shows the several positions thereof.

FIG. 35 is a schematic side elevational view of the base of the machine, and shows the general mounting of shaft sections therein.

FIG. 36 is a vertical sectional view taken through a coupling between two shaft segments.

FIG. 37 is a schematic exploded view showing the details of the shaft coupling.

FIG. 38 is a schematic elevational view showing the details of a typical mandrel clamp assembly.

FIG. 39 is a horizontal sectional view taken generally along the line 39—39 of FIG. 38, and shows more particularly the details of the clamp assembly including means for introducing fluids into the mandrel and means for retaining the mandrel against both rotational and axial movement.

FIG. 40 is an enlarged vertical sectional view taken generally along the line 40—40 of FIG. 39, and shows the specific details of the mounting of both a locating pin and a sealing unit and the means for effecting removal thereof, the mandrel being omitted for purposes of clarity.

FIG. 41 is a sectional view similar to FIG. 40 showing the mandrel in clamped sealed supported relation.

FIG. 42 is an exploded perspective view with parts broken away and shown in section showing the manner in which a retaining pin is carried by a supporting element.

FIG. 43 is a fragmentary elevational view of still another form of gripper-separator device.

FIG. 44 is a fragmentary vertical sectional view taken generally along the line 44—44 of FIG. 43, and shows the relationship of the blades of both the gripper and the separator and the actuating mechanism therefor.

FIG. 45 is a fragmentary vertical sectional view taken generally along the line 45—45 of FIG. 43, and shows the mounting of a typical blade.

FIG. 46 is a fragmentary transverse vertical sectional view showing the specific details of one of the fluid cylinders and the return means therefor.

FIG. 47 is a fragmentary transverse sectional view taken through the machine, and shows in elevation yet another form of gripper.

FIG. 48 is a fragmentary longitudinal vertical sectional view taken on the line 48—48 of FIG. 47, and shows specifically the details of the mounting of the blades and the means for advancing and retracting the blades.

FIG. 49 is a fragmentary elevational view showing the mounting of a cam member for actuating the blades.

FIG. 50 is a fragmentary transverse sectional view taken through the machine, and shows in elevation a separator which cooperates with the gripper of FIG. 49.

FIG. 51 is a fragmentary longitudinal vertical sectional view taken generally along the line 51—51 of FIG. 50, and shows the mounting of the blades of the separator and the means for advancing and retracting the same.

FIG. 52 is a fragmentary elevational view showing the manner in which a cam actuator for the blades is mounted.

Figure 2B:
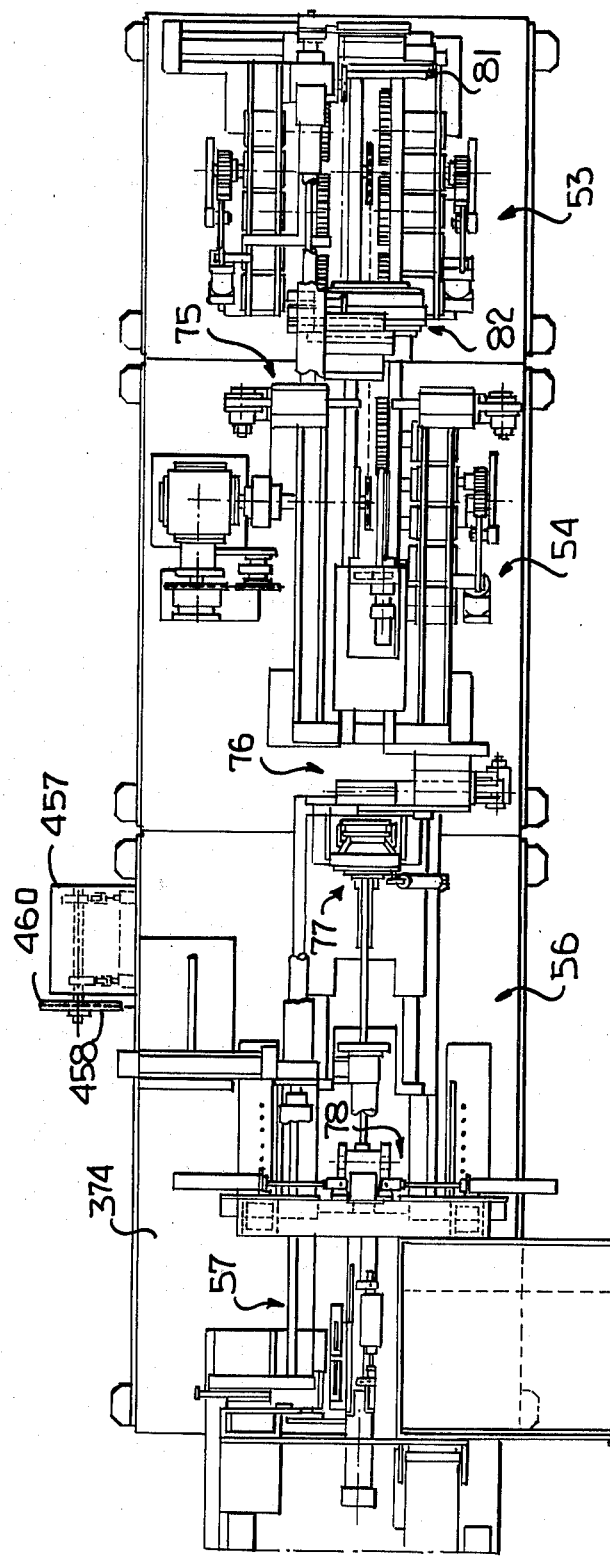

Referring now to the drawings in detail, reference is first made to FIGS. 1A, 1B and 2A, 2B wherein the general details of the continuous casing shirring and spinning machine are illustrated, the machine being generally identified by the numeral 50. The machine is formed of a plurality of replaceable units hwich include a casing feed and shirring unit 51 located at the head of the machine. Next, there is a combined shirred casing hold back and density control unit 52. This is followed by a casing separator unit 53 which receives the density controlled shirred casing and separates it into individual strands of regulated lengths. When desired, there is next an auxiliary hold back unit 54 which also carries clamp type supports for the mandrel in a manner to be described in detail hereinafter, the mandrel being generally identified by the numeral 55.

The next unit is a casing compressor and doffer unit generally identified by the numeral 56. This unit has associated therewith a combined strand handler and end closer unit 57.

Bridging generally between the units 53 and 56 is a transport device 58 for transporting a separated shirred casing strand from the casing separator device 53 into the combined casing compressor and doffer device 56.

Referring specifically to FIGS. 1A and 2A, it is to be understood that basically the unit 51 is conventional and forms no part of this invention. The unit 51 includes a mounting base 61 which has extending forwardly from the front end thereof a support 62 for a reel holder 63 which, in turn, is adapted to have received thereon a reel 64 of flat casing. The casing, 65, is in the form of a tubular film of collagen or cellulose which are extensively used as a sausage casing. The film is initially formed as a continuous tube and is rolled flat. The flat film is fed through a nip defined by a metering roll 66 and a back-up roll 67 onto the forward end of the mandrel 55 wherein it is automatically opened and is internally pressurized by a combined air spray and lubricant or softening fluid spray.

The opened casing 65 is then fed along the mandrel 55 at a controlled rate by a pair of opposed drive belts 68, 70 in a conventional manner. The casing 65 next passes through a shirring head 71 which includes a plurality of conventional shirring wheels 72 which radially inwardly fold or shirr the casing so that many feet of the casing may be compressed into a relatively short space. For example, eighty feet of casing may eventually be compressed into a stick or strand having a length on the order of thirteen inches.

The shirred casing, identified by the numeral 73, then passes into a combined casing hold back and density control device 74 which is part of the density control unit 52. The device 74 receives the shirred casing and permits the shirred casing to be advanced at the same rate as it is shirred by the shirring head 71. The device 74 is also mounted for rotation about the axis of the mandrel so as to impart a spin to the shirred casing 73 as desired. The density control device 74 may be selectively rotated in opposite directions either continuously or alternately so as either continuously to spin the casing in a selected direction or first to spin the casing in one direction and then in the opposite direction so as effectively to cancel the spin in the overall length of the casing.

Referring now to FIGS. 1B and 2B, the density controlled shirred casing is directed to the unit 53 which at timed intervals is operated to grip an intermediate portion of the shirred casing with one set of fingers holding back the casing and the other advancing the casing to tear off or segregate a leading portion of the casing into individual sticks or strands of controlled length.

At this time it is pointed out that while the mandrel 55 is generally supported at spaced intervals along its length by various components of the machine 50, there are two sets of mandrel support clamp assemblies 75 and 76. The mandrel support clamp assemblies 75 and 76 serve to introduce into the mandrel 55 in a known manner separate streams of air and lubricating or casing softening liquids. One of the support clamp assemblies 75 and 76 remains closed at all times and is separately openable to permit a separated casing strand to be advanced along the mandrel 55 to the device 56 for first compressing the strand and then doffing the strand from the tail end of the mandrel.

The auxiliary hold back device 54, when utilized, engages the advancing end of the shirred casing 73 and cooperates with the combined casing hold back and separator device 53 to maintain the density of the shirred casing.

When a casing strand is separated, it is engaged by the transporter 58 and transported first to an intermediate position between the mandrel support clamps 75, 76 and then through the mandrel support clamp 76 and a head of the shirred casing compressor and doffer unit 56 for an operation thereon by the device 56.

The combined casing compressor and doffer unit 56 includes a travelling head 77 which, in association with an openable stop assembly 78 first functions to compress a casing strand and then to doff the casing strand from the mandrel 55 and deliver it to the strand holder and closer unit 57.

Figure 3:
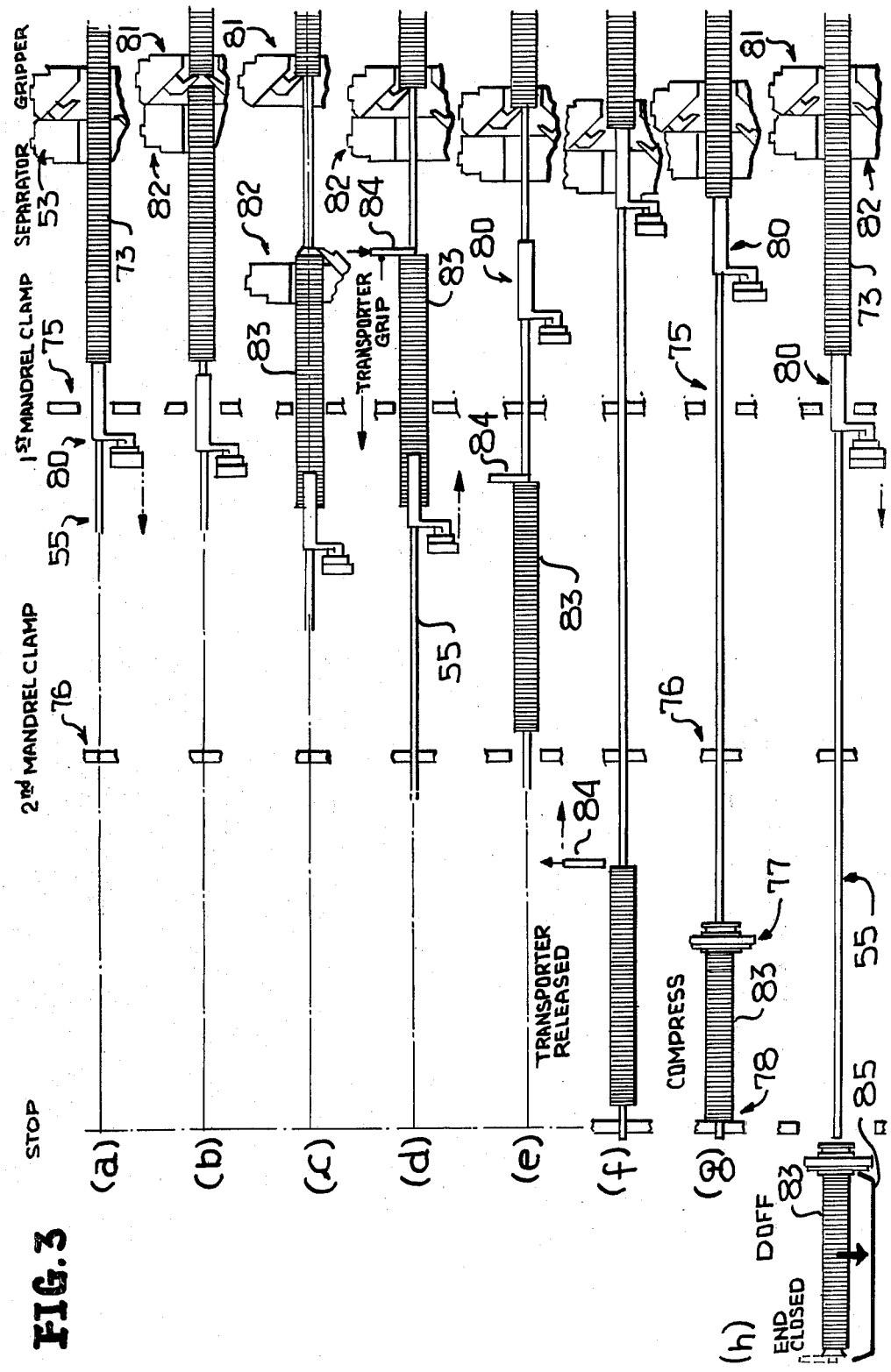
FIG. 3 is a schematic view showing the sequence of operation of the machine.

Reference is now made to the schematic showing of FIG. 3. It will be seen that with the mandrel support clamp 75 open and the mandrel support clamp 76 closed, the shirred casing 73 is advanced through the combined casing hold back and separator device 53 and a preselected length of the shirred casing has passed through the device 53. At this time, when the auxiliary hold back device 54 is used, a hold back head 80 of the auxiliary hold back device 54 will generally surround the mandrel 55 and permit the leading end of the shirred strand 73 to be advanced at the same rate as it is permitted to be advanced by the density control device 52.

At a controlled time, the head 80 will open and also begin rapidly to retract. At the same time the shirred casing will be gripped and held back by a hold back unit 81 of the device 53 while in the same plane as the unit 81 the shirred casing is also engaged by a separator unit 82 of the device 53. For a short period of time the units 81, 82 will be moved in unison, after which the unit 82 will be rapidly advanced as shown in FIG. 3c to pull apart an intermediate portion of the shirred casing 73 and to be able to separate from the continuously shirred casing a strand or stick 83. The separator unit then returns to its position adjacent the hold back unit 81, leaving the separated strand 83 advanced on the mandrel 55. The mandrel 55 is then loosely engaged by a pusher element 84 of the transporter 58 and the separated strand 83 moved to a position intermediate the mandrel support clamps 75, 76 as shown in FIG. 3e. At this time the support clamp assembly 75 closes, followed by the opening of the support clamp assembly 76 so that the casing strand 83 may again be transported along the mandrel 55.

Following the separation of the strand 83, it will be seen that the hold back unit 81 continues to engage the leading end of the shirred casing and cooperates with the density control device 74 to maintain the controlled density of the shirred casing.

The auxiliary hold back device, when utilized, next advances the head 80 thereof to engage the leading end of the shirred casing and the hold back unit 81 releases the leading end of the shirred casing so that the shirred casing may now pass through both the hold back unit 81 and the separator unit 82 under the control of the auxiliary hold back unit 54.

In the meantime, the casing strand 83 is being operated on by the combined casing compressor and doffer unit 56. The stop 78 is closed and the head 77 engages the trailing end of the separated casing strand 83 and serves to compress the strand to the desired length. For example, the strand of controlled density may have had a length on the order of twenty-five inches when initially separated from the following shirred strand portion and is compressed to a length on the order of thirteen inches.

If desired, while the strand is being compressed, the head 77 may be oscillated or rotated about the mandrel 55 to shape the trailing end of the strand 83 to repair any minor deformation which may have occurred during the separation of the strand.

The stop 78 is then opened and the head 77 is further moved along the mandrel to doff the compressed strand 83 from the mandrel 55. The doffed strand is then received by a strand handler and closer 57 which laterally shifts the compressed strand into alignment with an end closer which is conventional, and thereafter deposit the closed strand in a receiving tray 85.

It is to be understood that the machine 50 is adjustable to receive tubular films of different diameters and different materials. Further, it is to be understood that the machine 50 is intended to supply strands of different lengths containing different footage of casing. Accordingly, it is necessary that the drive for the machine be adjustable. With reference to FIG. 1A, it will be seen that the machine 50 includes a primary drive motor 86 which drives a shaft 87 by means of a drive chain or belt 88. There is driven from the shaft 87, among other components, the shaft 60. In order to accomplish this, there is a shaft 90 which is driven from the shaft 87 by means of a drive belt or chain 91 and the shaft 90 constitutes the input for a quick change gear unit generally identified by the numeral 92. The quick change gear unit 92 includes a readily openable housing 93 into which the shaft 90 extends. The shaft carries a gear 94 with which there is meshed an intermediate gear 95 which, in turn, is meshed with a gear 96 carried by an output shaft 97. The intermediate gear 95 is carried by a shaft 98 which, in turn, is adjustable on a support 100.

The gear 94 is replaceable to change the drive radio between the shaft 90 and the shaft 97 and the shaft 98 is shifted in accordance with the selected gear diameter so that the gear 95 will mesh with the new gear 94.

The shaft 97 extends transversely of the machine 50, as is best shown in FIG. 4, and is provided adjacent its opposite end with a drive belt connection 101 to a shaft 102 which is coupled to a reduction gear drive unit 103. The reduction gear drive unit 103 is coupled to the forward end of the control shaft 60 for effecting the rotation thereof at a greatly reduced speed. It is to be understood that the control shaft 60 is preferably rotated one revolution for each operating cycle of the machine 50. That is, for each revolution of the shaft 60 there will be formed one shirred casing strand 83.

It is to be understood that knowledge of the exact angular displacement of the shaft 60 is critical, and accordingly there is suitably secured to the forward end of the shaft 60 or an extension thereof in the drive unit 103 a pointer 104. The housing of the drive unit 103 carries a fixed degree wheel 105. In this manner the angular displacement of the shaft 60 may be accurately related to the drive therefor.

With reference to FIG. 5, it will be seen that the quick change drive 92 and its coupling to the shaft 60 is schematically illustrated, and the above described parts may be best understood by reference thereto.

Referring once again to FIGS. 1A and 4, it will be seen that the drive feed measuring roll 66, the feed belts 68, 70 and the shirring head 71 is taken from the shaft 87 in a conventional manner and that the rotational speed of the shaft 60 is varied by way of the quick change gear box 92 without changing the efficient operation of the casing feed and the shirring head.

Reference is now made to FIGS. 6-13 wherein the details of the combined spinning and density control unit 74 are best illustrated. First of all, as is shown in FIG. 1A, the unit 74 is mounted on a heavy base 106 through which the control shaft 60 runs and in which a section of the control shaft is mounted for rotation. The base 106 is positioned adjacent to and coupled to a heavy base 107 of a similar construction for the casing feed and shirring mechanism.

The combined density control and spinning device 74 includes a further supporting base structure 108 which is suitably mounted on the base 106. The supporting base structure 108 includes an upper platform 110 which has extending upwardly therefrom in longitudinally spaced relation a pair of vertical supports 111, 112. A frame, generally identified by the numeral 113, is positioned between the supports 111, 112. The frame 113 includes a pair of end plates 114, 115. The end plate 114 is provided with a tubular extension 116 which extends through the support 111 and is rotatably journalled therein by means of a bearing 117. The end plate 115 is mounted for rotation relative to the support 112 by a tubular extension 118 which, in turn, is rotatably journalled in a tubular shaft 120 by means of suitable bearings 121. The tubular shaft 120 is rotatably journalled in the support 112 by means of a bearing 122.

The frame also includes a pair of longitudinal frame members 123 (FIG. 10) which extends between and are rigidly secured to the end plates 114, 115. Each frame member 123 carries a drive belt assembly, generally identified by the numeral 124.

Figure 7:
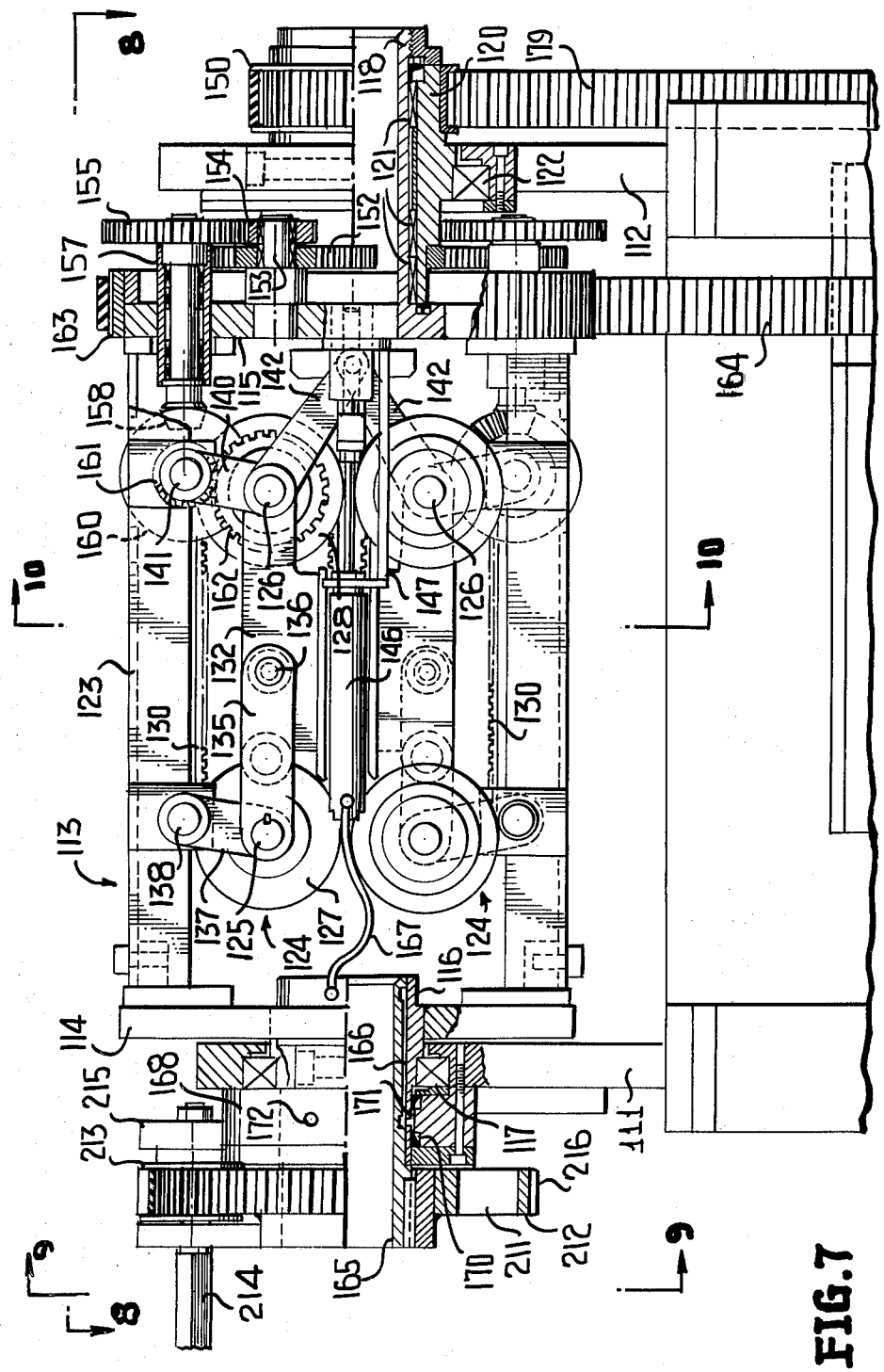
FIG. 7 is a longitudinal sectional view taken through the device of FIG. 6 generally along the line 7—7 of FIG. 6.
Figure 8:
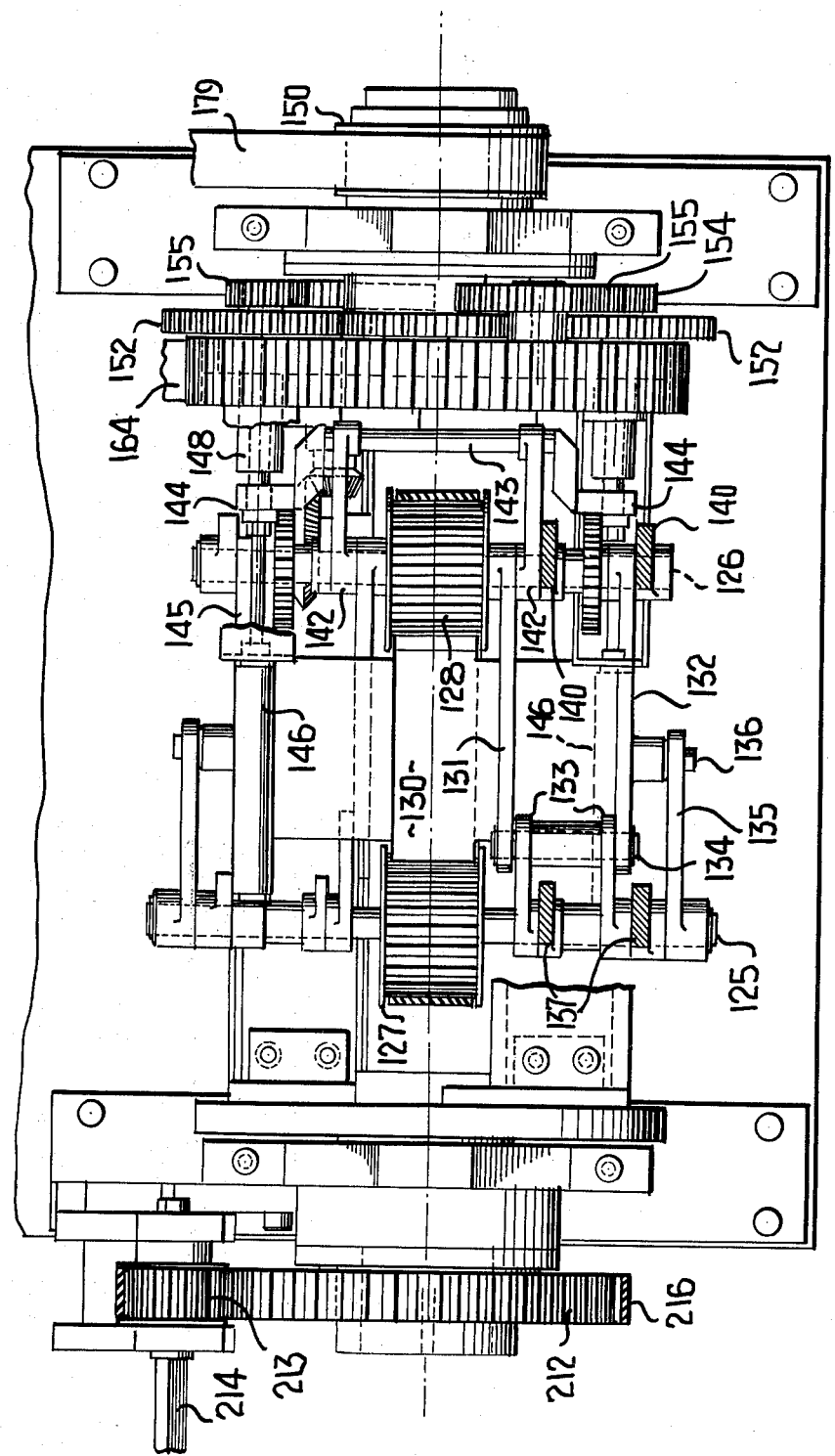
FIG. 8 is a plan view of the density controlling device of FIG. 7 taken generally along the line 8—8 of FIG. 7.
Figure 12:
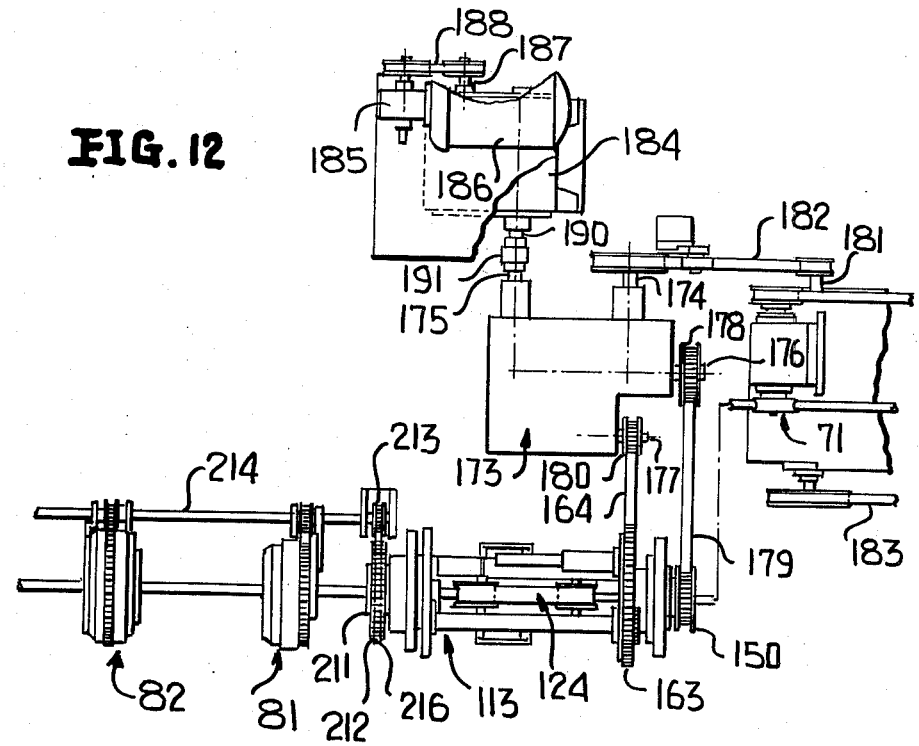
FIG. 12 is a schematic plan view showing generally the manner in which the density control device is driven both to control the density of the shirred casing and to effect a spinning thereof.

Each drive belt assembly 124 includes a pair of shafts 125, 126 which carry sprockets 127, 128 respectively which, in turn, have entrained thereover a drive belt 130. As is best shown in FIGS. 7 and 8, the shafts 125, 126 are joined by inner and outer frame members 131, 132 which have their right ends journalled on the shaft 126. The frame members 131, 132 are coupled to spaced links 133 by a pivot shaft 134 with the links 133 having their other ends journalled on the shaft 125. The unit is rigidified by a link 135 which is journalled on the shaft 125 and is coupled to the frame member 132 by a pin 136. This arrangement permits the sprockets 127, 128 to be momentarily moved together to facilitate the mounting of the belt 130 thereon.

The shafts 125 and 126 also carry links 137 which have their opposite ends pivotally mounted on a shaft 138 carried by the frame member 123. At this point it is to be understood that the shaft 125 is a fixed shaft and that the sprocket 127 is rotatably journalled thereon.

The shaft 126 also carries links 140 which correspond to the links 137 and are pivotally mounted on a shaft 141 also carried by the frame member 123. The links 137, 140 thereby provide for a parallel movement of the belt assembly.

The shafts 126 of the two drive belt assemblies carry links 142 which are coupled to a transversely extending coupling member 143 which is provided with a central opening therethrough, as is best shown in FIG. 10. The ends of the coupling member 143 are in turn connected by links 144 of a generally Z configuration to piston rods 145 of fluid motors 146. The fluid motors 146 are individually mounted on the end plate 115 by way of suitable support brackets 147. The extreme ends of the piston rods 145 are journalled in guide blocks 148 carried by the end plate 115. It will be apparent that the coupling between the fluid motors 146 provides a controlled uniform simultaneous movement of the two drive belt assemblies 124.

At this time it is pointed out that any type of extensible or linear drive unit may be utilized.

Referring back to FIG. 7, it will be seen that the shaft 120 carries a drive sprocket 150 to facilitate the rotation thereof. On its inner end, the tubular shaft 120 carries a sun gear 151 which is part of a planetary gearing system and which sun gear drives planetary gears 152, which are rotatably journalled on stub shafts 153 carried by the end plate 115 on the external surface thereof. The gears 152 are, in turn, coupled to gears 154 for rotation therewith. The gears 154 are meshed with gears 155 which are carried by stub shafts 156 rotatably journalled in tubular housings 157 carried by the end plate 115. The opposite end of each stub shaft 156 carries a bevel pinion 158 which is meshed with a bevel gear 160. The bevel gear 160 is in turn journalled on the shaft 141 and has coupled thereto a pinion 161 which is meshed with a pinion 162 coupled to the sprocket 128.

From the foregoing it will be apparent that when the sprocket 150 is rotated to drive the tubular shaft 120, the sprockets 128 will be driven, at a reduced speed controlled by the planetary gearing, to drive the drive belts 130 at a rate which will correspond to the speed at which the shirred casing is delivered by the shirring head.

It is to be understood that the sole function of the drive belts 130 is to hold back or drive the shirred casing at a controlled speed which will control the density of the shirred casing. By controlling the density, it is meant that there will be a prescribed number of feet of casing which has been shirred per unit length of the shirred casing. It is important that density be controlled in that unit lengths of the shirred casing will be separated at a later stage and if the density varies the actual casing per casing strand will vary, and this is highly undesirable.

It is also to be understood that the frame 113 is to be rotated so as to effect a spinning of the shirred casing. The rotation of the frame 113 is effected by means of a sprocket 163 carried by the end plate and having engaged therewith a drive belt 164.

Inasmuch as the extensible motors 146 will rotate when the frame 113 is rotated, it is necessary to provide a suitable fluid coupling between a fluid source and the cylinders. To this end, the tubular extension 116 has positioned therein and secured thereto in sealed relation a sleeve 165 which together with the tubular extension 116 defines a fluid passage 166 which is sealed at its axial ends. The tubular extension 116 has suitable ports therein coupled to the inner end of the fluid passage 166 and a hose 167 extends between each cylinder 146 and a respective port.

Fluid is directed from externally of the unit into the fluid passage 166 through a collar 168 which is fixed relative to the support 111 and is provided with seals 170 on opposite sides of an annular fluid passage 171 surrounding the axially outer part of the tubular extension 116. The fluid passage 171 opens into the outer end of the fluid passage 166 and is in communication with an external fluid supply through a radial port 172. It is to be noted that opposite ends of the fluid passage 166 are of increased depth to facilitate flow into and out of the fluid passage.

As described above, there are separate drives for effecting the driving of the drive belt assemblies 124 and the rotation of the frame 113 and the drive belt assemblies carried thereby. It will also be understood that the rotation of the frame 113 would normally affect the speed of the belts 130 in that the planetary gearing would be rotating relative to the sun gear and, depending upon the direction of rotation, would be in one instance additive and in the opposite sense subtractive. Accordingly, there is provided a differential drive generally identified by the numeral 173. The differential drive 173 has two input shafts 174 and 175 and two output shafts 176 and 177. The output shaft 176 carries a sprocket 178 which is aligned with the sprocket 150 and coupled thereto by a drive belt 179. The output shaft 177 carries a sprocket 180 which is aligned with the sprocket 163 and is coupled thereto by a belt 164.

Inasmuch as the input shaft 174 controls the speed of drive of the drive belt assemblies 124, it is essential that it be correlated to the drive for feeding the casing and for driving the shirring head. Accordingly, the input shaft 174 is driven from a shaft 181 by a drive belt arrangement 182 with the shaft 181 being driven from the main drive of the machine by a drive belt arrangement 183. Thus the drive of the input shaft 174 is directly correlated with the rate at which the casing is being shirred so that any change in speed of the shirring head 71 will result in a like speed of the drive belt assemblies 124.

The input shaft 175 is driven through a speed reducing transmission 184 from a speed reducer 185 of a drive motor 186. The speed reducer 185 is coupled to an input shaft 187 of the transmission 184 by a belt drive 188 and an output shaft 190 of the transmission 184 is coupled to the input shaft 175 by a suitable drive coupling 191.

Figure 13:
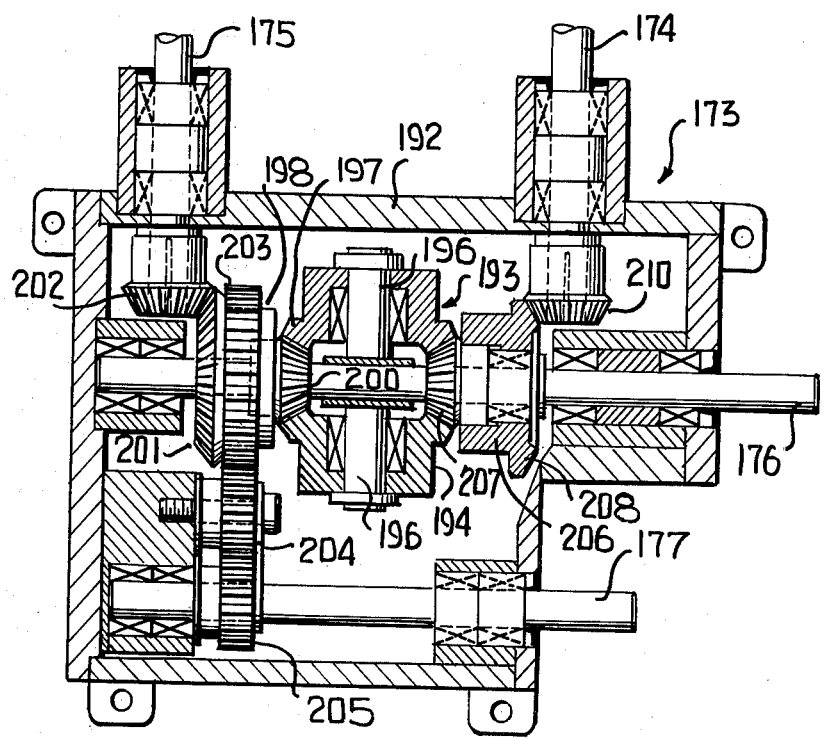
FIG. 13 is a longitudinal sectional view taken through the differential drive device for the density control device.

Reference is now made to FIG. 13 wherein the general details of the differential drive 173 are shown. The differential drive 173 includes the usual housing 192 and the input shafts 174 and 175 are journalled therein in any desired manner. In a like manner, the output shafts 176, 177 extend into the housing 192 and are journalled therein. The output shaft 176 extends entirely across the housing 192 and is provided intermediate the ends thereof with a differential drive unit generally identified by the numeral 193. The differential drive unit 193 includes a drive sleeve 194 which is fixed to the shaft 176 for driving the same. The sleeve 194 has extending in opposite directions therefrom a shaft 196 which has rotatably journalled thereon bevel gears 197.

On one side of the bevel gears 197 is a gear unit which includes a hub 198 which carries a bevel pinion 200 which meshes with the bevel gears 197. The opposite end of the hub 198 carries a bevel gear 201 which meshes with a bevel pinion 202 carried by the input shaft 175. The hub 198 further carries a pinion 203 which is meshed with an intermediate pinion 204 which, in turn, is meshed with a drive pinion 205 secured to the output shaft 177.

Finally, on the opposite side of the bevel gears 197 there is a gear unit which includes a hub 206 which carries a bevel pinion 207 which meshes with the bevel gears 197. The opposite end of the hub 206 carries a bevel gear 208 which meshes with a bevel pinion 210 carried by the input shaft 174.

The gearing of the differential drive unit 173 is such that when the input shaft 175 is stationary the output shaft 177 will also be stationary and will have no affect upon the rotational speed of the output shaft 176. However, when the shaft 175 is rotated, depending upon its direction of rotation, it will have an additive or subtractive effect on the rotational speed of the output shaft 176. This additive or subtractive effect will correspond exactly to the additive or subtractive effect of the rotation of the frame 113 on the planetary gear drive for the drive belt units 124. Thus, the differential drive unit 173 serves to provide a cancelling effect on the rotation of the frame 113 so that rotation of the frame 113 does not result in a speed-up or slow-down of the drive belts 130. It will thus be seen that once the driving of the drive belts 130 has been properly coordinated with the shirring of casing, the spinning of the casing in either direction or alternately in one direction and then the other will have no affect on the density control operation of the device.

Although a single unit has been provided for simultaneously holding back the shirred casing and for effecting the controlled spinning thereof, it is to be understood that separate devices could be provided for effecting the density control and for spinning the casing.

The rotation of the frame 113 to effect the spinning of the shirred casing requires a like rotation of any subsequent equipment which will become fixedly engaged with the spinning shirred casing. To this end there is provided an auxiliary drive from the frame 113. Referring once again to FIG. 7, it will be seen that there is provided a hub 211 which is keyed to the sleeve 165 for rotation therewith. The hub 211 carries a drive sprocket 212 which is aligned with a further sprocket 213 carried by a shaft 214 which is rotatably journalled in a bracket 215 affixed to the support 111. The sprockets 213 and 212 are drivingly connected together by a belt 216.

It is to be noted that the drive shaft 214 is preferably of a non-circular cross section so that other elements driven thereby may have a sliding connection therewith. For simplicity, the drive shaft 214 is square in cross section, although it may be of other configuration.

The shirred casing is separated into strands of predetermined lengths by a separator or cutoff device which includes a hold back unit 81 and a separator unit 82. Each of these units has gripping fingers which will engage the spinning shirred casing in fixed relation, and it is therefore necessary that each of the units 81, 82 be driven at the same rotational speed as the frame 113. Accordingly, the hold back unit 81 is provided with a fixed housing portion 217 and a rotating housing portion 218. The fixed housing portion 217 carries a bracket 220 in which there is rotatably journalled a hollow shaft 221 which is slidable on the square drive shaft 214. The shaft 221 carries a sprocket 222 which is aligned with a sprocket 223 on the housing portion 218 and is coupled thereto in driving relation by a drive belt 224.

In a like manner, the separator unit 82 includes a fixed housing portion 225 and a rotatable housing portion 225. The fixed housing portion 225 carries a bracket 227 in which there is rotatably journalled a tubular shaft 228 which is in sliding driven engagement with the square shaft 214. The shaft 228 carries a sprocket 230 which is aligned with a sprocket 231 on a rotatable housing portion 226 and is drivingly coupled thereto by a drive belt 232.

It will be seen that the driving arrangement is such that the units 81 and 82 may be moved longitudinally of the machine independently of one another and still be rotated at the same speed as is the frame 113.

Reference is now made to FIGS. 14–20 where further details of the combination separator and shirred casing gripper 53 are illustrated. Most particularly, reference is first made to FIGS. 15 and 16 wherein there are illustrated the details of the separator unit 82. As previously described, the separator unit 82 includes a fixed housing portion 225 which carries a rotatable housing portion 226. The fixed housing portion 225 carries a support bracket 233 which, as is best shown in FIG. 15, is mounted on a pair of guide rods 234. The support bracket 233 further carries a rack 235 for effecting the reciprocation of the separator unit 82 in a manner to be described hereinafter.

The bracket 227 extends up and to the right from the fixed housing portion 225, as is also shown in FIG. 15, so that the separator unit 82 may slide along the square drive shaft 214 and still be driven thereby.

As is best shown in FIG. 16, the rotatable housing portion 226 is mounted for rotation on the fixed housing portion 225 by means of bearings 236. The fixed housing portion 225 and the rotatable housing portion 226 have aligned central openings therethrough in which there is positioned the mandrel 55 and wherein there is sufficient clearance for shirred casing of the maximum size which is intended to be accommodated by the machine.

The separator unit 82 is provided with a plurality of circumferentially spaced shirred casing gripper fingers 237 which slope downwardly and to the right toward the direction of casing advance and terminate in blades. In the illustrated embodiment of the invention there are three such fingers 237.

Each finger 237 is suitably guided in the housing portion 226 and is carried by a piston extension 238 of a piston 240. The piston 240 is mounted within a cylinder 241 with the piston and cylinder being of the single acting type.

As is clearly shown in FIG. 16, the rotatable housing portion 226 carries a fluid supply ring 242 which is fixed against rotation by suitable attachment to the support bracket 223. The fluid supply ring 242 is sealed to the periphery of the rotatable housing portion 226 by way of suitable seals 243 and in combination with the periphery of the rotatable housing portion 226 defines an annular fluid supply passage 244 into which a supply port 245 opens. The rotatable housing portion 226 is provided with a supply passage 246 for each of the cylinders 241.

Each finger 237 is constantly urged toward retracted position by a pair of tension springs 247 which extend between a guide member 248 and the rotatable housing portion 226 with the guide member 248 being disposed between the finger and the piston extension 238.

Reference is now made to FIGS. 17-20 wherein the specific details of the hold back unit 81 are illustrated. The fixed housing portion 217 is provided with a pair of support brackets 250, 251 which are mounted on a pair of guide rods 252, 253. Further, the support bracket 251 carries a rack 254 for effecting the reciprocation of the hold back unit 81 in a manner to be described in detail hereinafter.

Referring now particularly to FIG. 18, it will be seen that the fixed housing portion 217 carries a pair of bearings 255 which mount the rotatable housing portion 217 for relative rotation. It will also be seen that the fixed housing portion 217 and the rotatable housing portion 218 have aligned central openings through which the mandrel 55 passes with the openings being of sufficient size to accommodate the maximum diameter shirred casing for which the machine is intended.

The rotatable housing portion is provided with a plurality of cylinders 256 which are circumferentially spaced and which have mounted therein pistons 257 provided with extensions 258. Adjacent each cylinder 256 there is a casing gripping finger 260 which terminates in a blade and is carried by a guide 261 which is slidably mounted within the rotatable housing portion 218 adjacent a respective cylinder 256. Each guide member 261 is attached to the piston extension 258 by a fitting 262. Further, attached to the fitting 262 are tension springs 263 which are anchored relative to the rotatable housing portion 218 and serve to return the fingers 260 to retracted positions. The mounting of the springs 263 is best shown in FIG. 20 wherein the springs are illustrated as being positioned within bores 264 and being anchored relative to the rotatable hosuing portion 218 by a wire clip 265.

The rotatable housing portion 218 carries a fluid supply ring 266 on its periphery adjacent the sprocket 223, as is best shown in FIG. 18. The fluid supply ring 266 is configurated on its inner surface to define an annular fluid passage 267 which is disposed next to the peripheral surface of the rotatable housing portion 218 between two seals 268. The supply ring 266 also is provided with a supply port 270 which opens into the passage 267.

The rotatable housing portion 218 is provided with a fluid passage 271 and each of the cylinders 256 with the fluid supply passages 271 opening through the periphery of the rotatable housing portion 218 in alignment with the annular passage 267.

Referring back to FIG. 14, it will be seen that immediately prior to the separation of the casing strand 83 from the shirred casing 73 the fingers 260 are gripping the shirred casing 73 in a holding back manner while the fingers 237 are engaging the shirred casing immediately circumferentially adjacent that portion engaged by the fingers 260. Then, while holding of the hold back unit 81 to a movement corresponding to the rate of advance of the shirred casing 73 and rapidly moving the separator unit 82 to the left, as shown in FIG. 14, there will be a sharp tensional force applied against the shirred casing between the two sets of fingers with the result that the shirred casing will rupture and tear circumferentially so as to separate without undue damage to either end of the separated shirred casing.

It is to be understood that the combined casing hold back and separator unit 53 is mounted on a rigid base 272 which is positioned next adjacent the rigid housing 106 and is suitably fixed relative thereto. The base 272 carries a machinery housing 273. The guide rods 234, 252 and 253 are suitably mounted on the machinery housing 273 by means of suitable brackets which in and of themselves form no part of this invention.

Within the machinery housing 273 are separate drive systems for effecting the reciprocation of the racks 235 and 254. These two drive systems are of a similar nature but will be separately described.

First of all, there is a common drive shaft 274 for the two drive systems, the shaft 274 extending transversely of the machinery housing and being suitably journalled within bearings 275, 276 mounted therein. The drive belt 274 carries a sprocket 277 which is driven by a drive chain 278 the details of which will be set forth hereinafter.

The drive system for the rack 235 includes a plurality of shafts 280 which are mounted within bearings 281. Each shaft 280 carries a pinion 282 which is in position to be meshed with the associated rack 235. At this time it is pointed out that the mounting of each pinion 282 relative to the shaft 280 is one wherein the pinion may be angularly adjusted relative to the shaft.

Each shaft 280 also carries a drive pinion 283. As is best shown in FIG. 21, the drive pinions 283 are spaced and are drivingly interconnected by intermediate pinions 284 which are carried on stub shafts 285 and 286. Thus, all of the pinions 282 are rotated in unison. As is apparent from FIG. 21, the length of the rack 235 is much shorter than the stroke or linear movement thereof. Thus, the rack 235, as it shifts longitudinally of the machine housing 273, is sequentially engaged by the piniosn 282 to have a very long effective stroke. The stroke of the rack 235 is greatly in excess of its length and this stroke is made possible by the plurality of pinions 292 and the mounting thereof so that they are in adjusted coordinated relation with respect to the rack so that there is no binding even when the rack is engaged simultaneously by two pinions 282.

The pinions 282 are driven through the shaft 286 and the intermediate gear 284 carried thereby. The shaft 286 extends to the exterior of the machine housing 273 and has mounted thereon a drive pinion 286 which is engaged by a drive rack 288. The drive rack 288 is carried by an elongated arm 290 which is mounted on a pivot shaft 291 for oscillation.

The arm 290 carries a cam follower 292 which engages a cam 293 carried by one end of the shaft 274. In order that the cam follower 292 may be constantly engaged with the cam, the arm 290 is in the form of a crank and has a second arm 294 to which there is connnected an extensible fluid motor 295 which constantly urges the cam follower 292 against the cam 293 under a controlled pressure.

It is to be understood that for each complete rotation of the cam 293 there is a complete reciprocatory cycle of the rack 235.

The second drive system, whcih controls the position of the rack 254, is similar to the drive system for the rack 235 but differs therefrom primarily in that there are only two pinions 296. The pinions 296 are mounted on stub shafts 297 carried by bearings 298. Each shaft 297 also carries a drive pinion 300. It is to be understood that the pinions 296 are angularly adjustably mounted on their respective shafts 297.

With reference to FIG. 23, it will be seen that the drive pinions 300 are drivingly interconnected by an intermediate gear 301 which is carried by a stub shaft 302. The stub shaft 302 extends externally of the machine housing 273 and carries a drive gear 203 which is meshed with a rack 304. The rack 304 is carried by one arm 305 of a crank arrangement. The arm 305 carries a cam follower 306 which engages a cam 307 carried by the shaft 274. The arm 305 is constantly urged toward the cam 307 by way of an extensible fluid motor 308 engaged with a second arm 310 of the lever arrangement of which the arm 305 is a part.

It is to be understood that the rack 254 is also relatively short as compared to the desired stroke thereof and that it is transferred from one pinion 296 to the other with there being an intermediate position where the rack 254 is being simultaneously driven by both pinions 296. It is also to be understood that the complete reciprocatory cycle of the rack 254 is effected in a single revolution of the cam 307.

Figure 24:
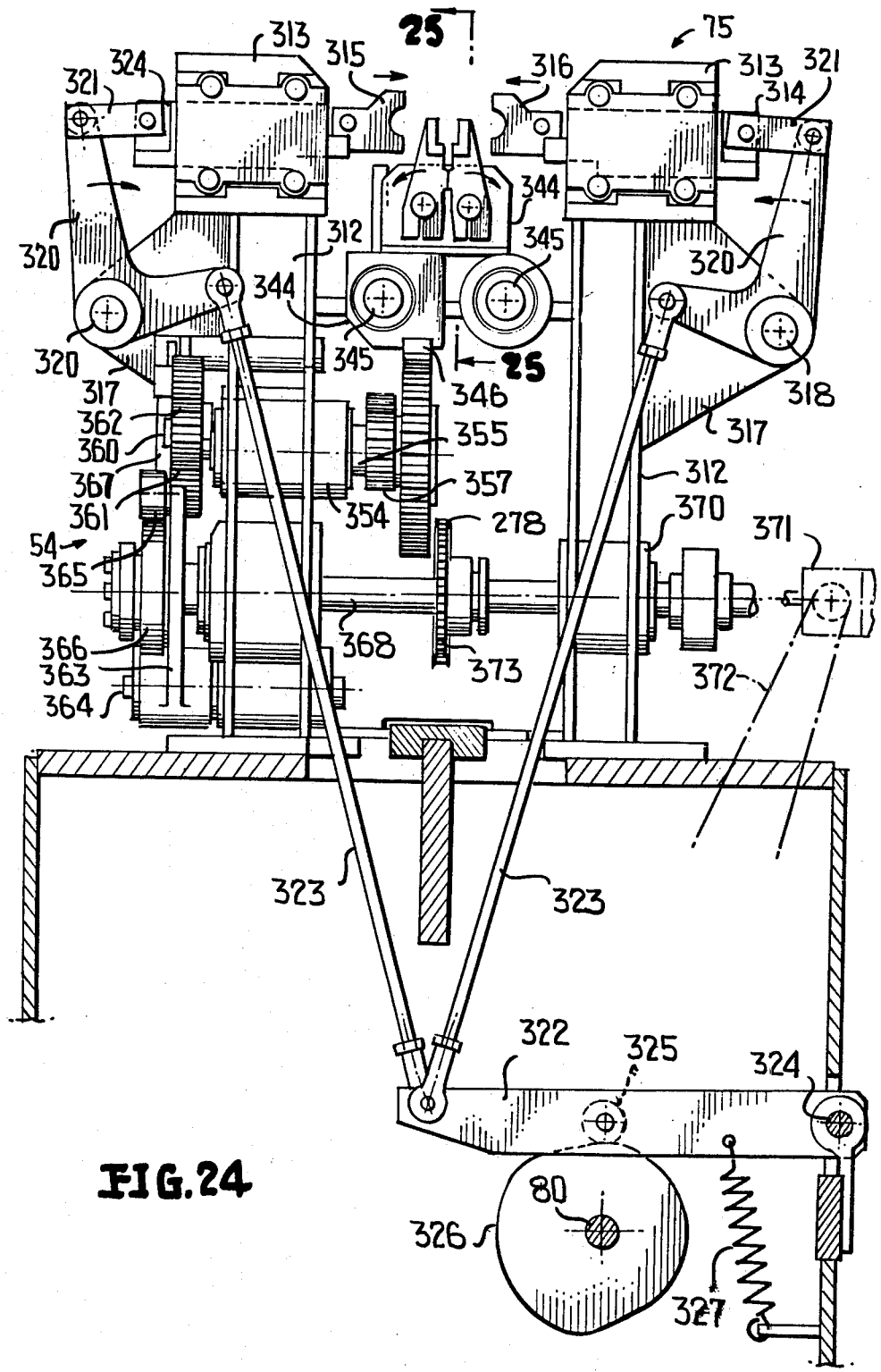
FIG. 24 is an enlarged fragmentary vertical sectional view showing generally the details of the mounting of mandrel supports and an auxiliary hold back device.

The main machinery frame includes a further heavy base 311 which is positioned next to the base 272 and is suitably fixed relatively thereto. The base 311 provides the primary support for the mandrel 55 and carries the mandrel support clamps 75 and 76. Referring now to FIG. 24, it will be seen that there is illustrated the general details of the mandrel support clamp 75. The base 311 has extending upwardly therefrom a pair of supports 312 each of which is provided at its upper end with a guide unit 313. Each guide unit 313 has slidably mounted therein for movement transversely of the machine a slide member 314. The slide members 314 carry opposed clamp halves 315 and 316 which have like configurations but slightly different functions as will be described hereinafter.

Each support carries a bracket 317 which, in turn, carries a pivot shaft 318 for the bell crank 320. Each bell crank 320 has one arm thereof connected to a pivot link 321 which, in turn, is connected to the slide member 314. The other arm of each bell crank 320 is connected to an actuating lever 322 by an elongated link 323. The lever 322 is carried by a pivot shaft 324 mounted on the base 311 and the lever 322 carries a cam follower 325 which rides on a cam 326 preferably carried by the control shaft 60. Suitable means, such as a spring 327, hold the cam follower 325 engaged with the cam 326.

It will be obvious that as the cam 326 rotates the lever 322 will move down, pivoting the bell cranks 320 to urge the clamp members 315, 316 together.

Figure 27:
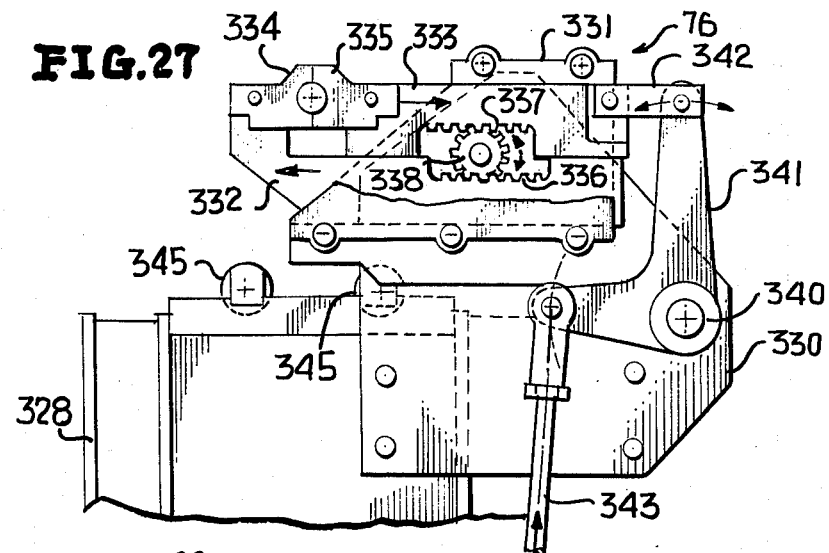
FIG. 27 is a transverse elevational view of a second mandrel support or clamp assembly.

Reference is now made to FIG. 27 wherein the general details of the mandrel support clamp 76 are shown. The base 311 has extending upwardly therefrom a support 328 which carries at its upper end a bracket 330. The bracket 330 carries a guide assembly 331 in which there are mounted slides 332 and 333. The slide 332 carries a mandrel clamp member 334 while the slide 333 carries a mandrel clamp member 335.

The slides 332, 333 are provided with respective rack portions 336, 337 which are in opposed spaced relation and are engaged with an intermediate pinion 338 so that when the slide 333 is moved in one direction, the slide 332 will move in the opposite direction.

The bracket 330 carries a pivot shaft 340 on which there is pivotally mounted a bell crank 341. One arm of the bell crank is connected to the slide 333 by a link 342 while the other arm of the bell crank has coupled thereto an actuating link 343 similar to the link 323. It is to be understood that although it has not been so illustrated, the link 343 will be actuated by a cam and lever arrangement as described with respect to the mandrel support clamp 75 and wherein the timing of the opening and closing of the mandrel support clamp 76 will be such that it is always closed when the mandrel support clamp 75 is open. In a like manner, the timing of the opening and closing of the mandrel support clamp 75 is such that it is always closed when the mandrel support clamp 76 is open.

Figure 25:
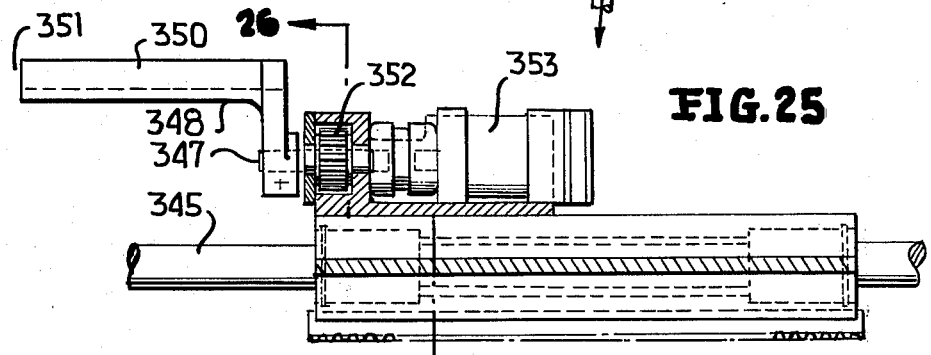
FIG. 25 is a fragmentary longitudinal vertical sectional view taken generally along the line 25—25 of FIG. 24, and shows generally the details of one-half of the auxiliary hold back device.
Figure 26:
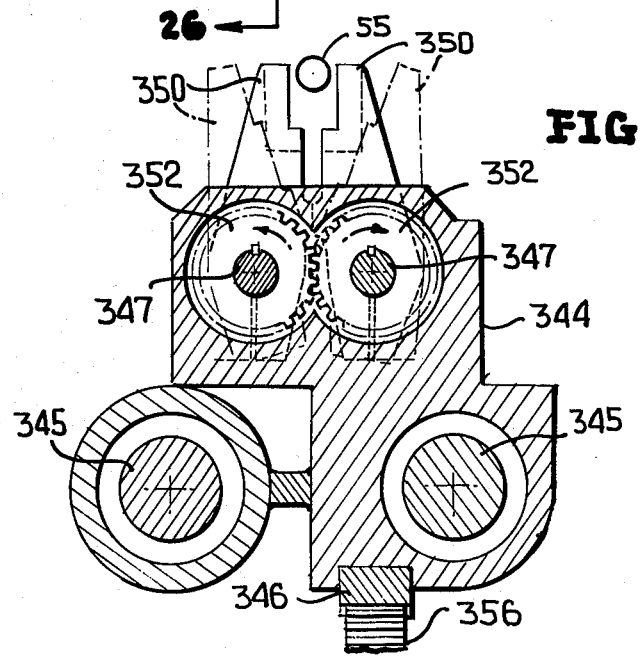
FIG. 26 is a fragmentary transverse vertical sectional view taken generally along the line 26—26 of FIG. 25, and shows further the details of the hold back device.

In FIGS. 24–26 there are illustrated the details of the auxiliary hold back device 54. The auxiliary hold back device 54 includes a carrier 344 which is mounted for reciprocation on a pair of guide rods 345 which are supported by way of suitable brackets carried by the supports 312 and 328. The carrier 344 has affixed to the underside thereof a rack 346 to effect the reciprocation thereof along the guide rods 345.

The carrier 344 has two longitudinally extending, transversely spaced shafts 347 mounted therein for rotation. Each shaft 347 carries a generally L-shaped mounting bracket 348 including an elongated, generally L-shaped support arm 350. Each support arm 350 has replaceably mounted thereon a hold back element 351 which is configurated to be disposed closely adjacent to the mandrel 55 and hold back the leading end of the shirred casing.

The shafts 347 carry meshing pinions 352 so that the shafts may be oscillated in unison to move the arms 350 together and apart as is shown in FIG. 26. One of the shafts 347 has a rotary drive member 353 coupled thereto for effecting the timed pivoting of the arms 350.

Referring now to FIGS. 1B and 24, it will be seen that the rack 346 is much shorter than its length of travel. In order to drive the rack 346 through a distance in excess of its length, there is carried by one of the supports 312, which is in the form of one side of a machine housing, suitable bearing assemblies 354 which carry stub shafts 355. Each stub shaft carries a pinion 356 which is meshed with the rack 346. It is to be understood that the relationship of the pinions 356 is such that two of the pinions may simultaneously mesh with and drive the rack 346 without binding.

There is also fixed to each stub shaft 355 a drive pinion 357 with adjacent drive pinions being meshed with intermediate pinions 358 so that all of the pinions 356 are driven in unison. One of the intermediate pinions 358 is carried by a shaft 360 which carries a drive pinion 361 which is meshed with an arcuate rack 362. The rack 362 is carried by an arm 363 which is mounted on a pivot shaft 364 and which has a cam follower 365 which engages a cam 366. The cam follower is held against the cam under pressure by a suitable pressure applying device 367 such as a fluid cylinder.

The cam 366 is carried by a shaft 368 which extends transversely of the machine and is rotatably journalled in suitable bearings 370 carried by the sides of the machinery housing which extend from the supports 312. The shaft 368 at the end remote from the cam 366 is coupled to a reduction gear unit 371 which is driven from the control shaft 60 by a drive connection 372.

The shaft 368, intermediate its ends, is provided with a drive sprocket 373 for the chain 278.

It is to be understood that the auxiliary hold back device 54, when used, will engage the leading end of the shirred casing 73 and serve to maintain the controlled density thereof at such time as it is not being held back by the fingers 260.

Reference is now made to FIGS. 28-34 wherein the details of the strand compressor and doffer 56 are illustrated. The strand compressor and doffer 56 is mounted on a machine base 374 adjacent to and in alignment with the machine base 311 and as previously briefly described includes a movable head 77 and an openable stop 78.

The head 77 includes a support member 375 which is rigidly mounted on a carriage 376 which is provided with slides 377 mounted on guide rods 378. The guide rods 378 are, in turn, carried by a carriage 380 which includes slides 381 mounted on guide rods 382 which are fixedly mounted on a supporting base 383.

The carriage 380 is provided with an upstanding support 384 which carries an extensible motor 385 in the form of a fluid cylinder having a piston rod 386 which is cooperable at one end with the support 375 to draw the carriage 376 along the guide rods 378.

The base 383 carries a second extensible motor 387 in the form of a fluid cylinder having an elongated piston rod 388 which is coupled to the support 375 of the carriage 380 for moving the carriage 380 along the guide rods 382.

Figure 32:
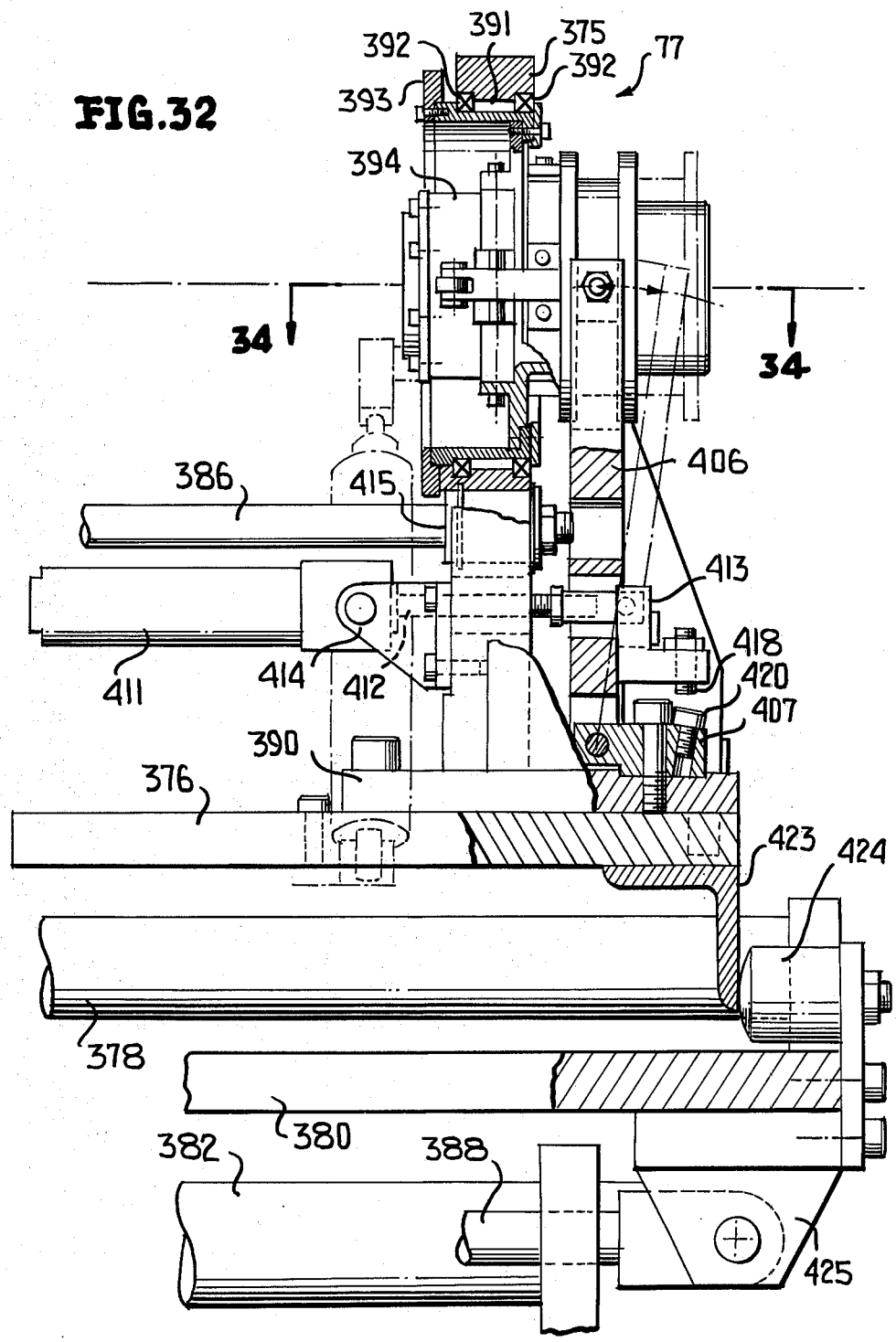
FIG. 32 is an enlarged fragmentary longitudinal sectional view taken generally along the line 32—32 of FIG. 31.
Figure 33:
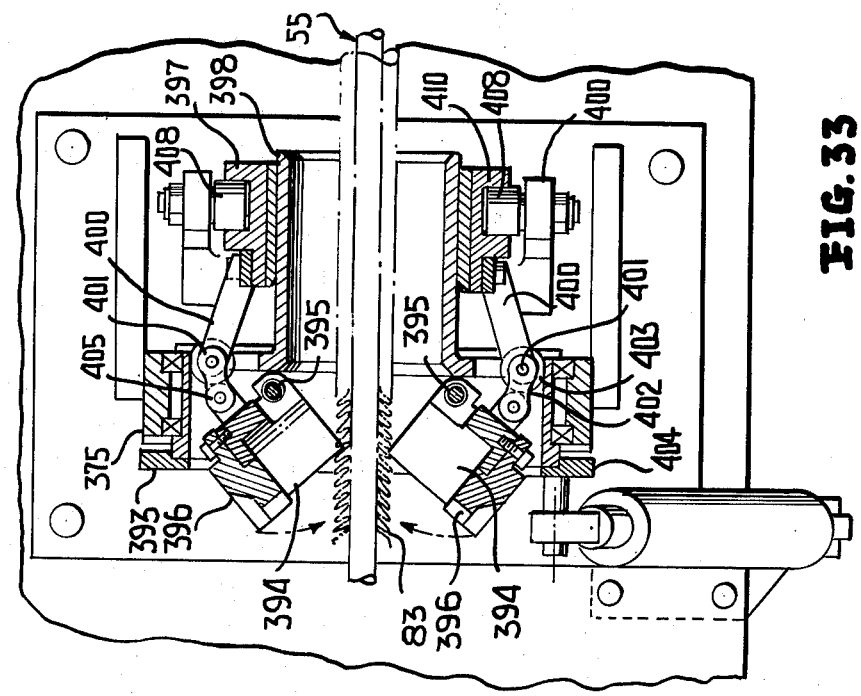
FIG. 33 is a schematic vertical sectional view taken through the head of the combined strand compressor and doffer, and shows the open position thereof to permit the passage of a shirred casing strand therethrough.
Figure 34:
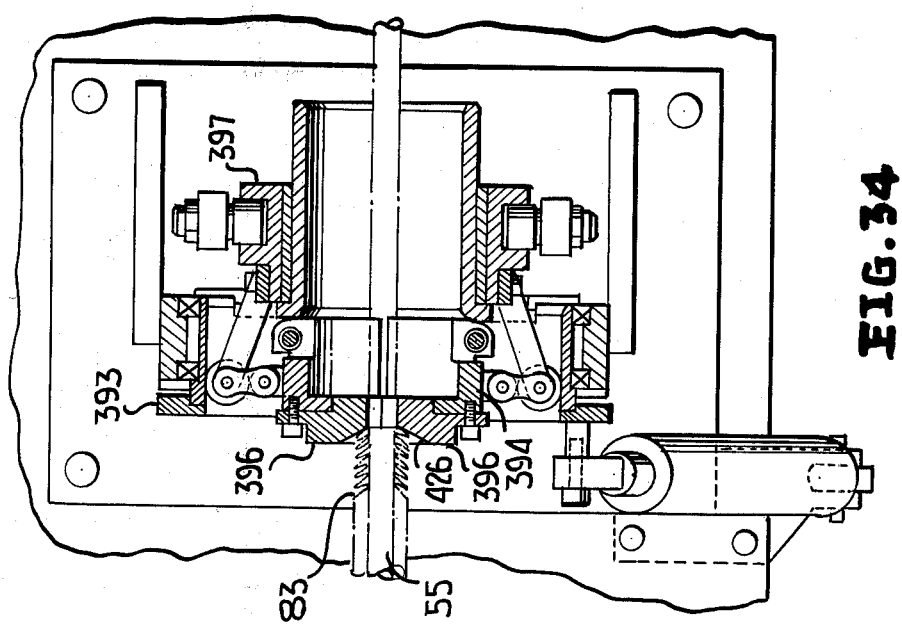
FIG. 34 is a view similar to FIG. 33 showing the strand having passed through the head and the head closed and in engagement with the strand.

Referring now to FIG. 32 in detail, it will be seen that the support 375 has a mounting base 390 which is fixedly secured to the carriage 376. The support 375 is in the form of a block having an enlarged opening 391 therethrough generally centered on the axis of the mandrel and having rotatably journalled therein by way of bearings 392 an oscillating head 393. The oscillating head 393, as is best shown in FIG. 33, has pivotally mounted thereon a pair of jaws 394. Each jaw 394 is pivotally mounted on the rotating head 393 by means of pivot shafts 395 for swinging movement between open and closed positions, as is best shown in FIGS. 33 and 34. Further, each jaw 394 carries a face plate half 396 for engaging a shirred casing strand 83 in a manner to be described hereinafter.

In order that the jaws 394 may be pivoted between open and closed positions, there is a collar 397 which is slidably mounted on a reduced diameter tubular extension 398 of the rotating head 393. The collar 397 has carried thereby arms 400 which are provided at their remote ends with pivot shafts 401 which both pivotally connect the arms 400 to links 402 and carry rollers 403 which run along trackways 404. The links 402 are in turn pivotally connected to the jaws 394 by pivot pins 405.

As will be readily apparent by a comparison of FIGS. 33 and 34, when the collar 397 is in its righthand position of FIG. 33, the jaws 394 are open, and when the collar 397 is moved to its lefthand position of FIG. 34, the arms 400 move the links 402 causing the links to cam the jaws 394 together.

As is best shown in FIG. 32, there is a yoke 406 which is disposed to the right of the support 375 and is pivotally mounted on a bracket 407 carried by the base 390. The yoke carries a pair of cam followers 408 which are disposed in a circular track 410 which extends about the collar 297. Thus, as is apparent from FIG. 32, when the yoke 406 is in upright position the jaws 394 are closed, and when it is tilted to the right the jaws are open.

The jaws 394 are opened and closed by pivoting the yoke 406 by means of an extensible fluid actuator 411 which is illustrated as a fluid cylinder and which has a piston rod 412 connected to a bracket 413 which, in turn, is carried by a yoke 406. The cylinder 411 is carried on the support 375 by way of a suitable bracket 414.

At this time it is pointed out that the bracket 413 and the bracket 407 carry cooperating adjustable stop elements 418 and 420 for limiting the opening movement of the jaws 394 by the cylinder 411.

A stop member 423 carried by the carriage 376 is engageable with a buffer 424 carried by the carriage 380 to restrict the stopping shock imparted to the head 77 upon its return.

As is shown in FIG. 32, the piston rod 388 is coupled to a depending bracket 425 at the right end of the carriage 380.

Referring now to FIG. 34, it will be seen that when the jaws 394 are in their closed position, the face plate halves 396 are closely spaced around the mandrel 55 and abut the end of the shirred casing strand 83 which is to be compressed. It is also to be noted that the face plate halves 396 combine to define a frustoconical surface 426 which engages the trailing end of the casing strand 83. This surface is a smooth surface and is suitable for reforming the casing strand end which was torn during the separation of the strand from the continuously shirred casing 73.

Figure 31:
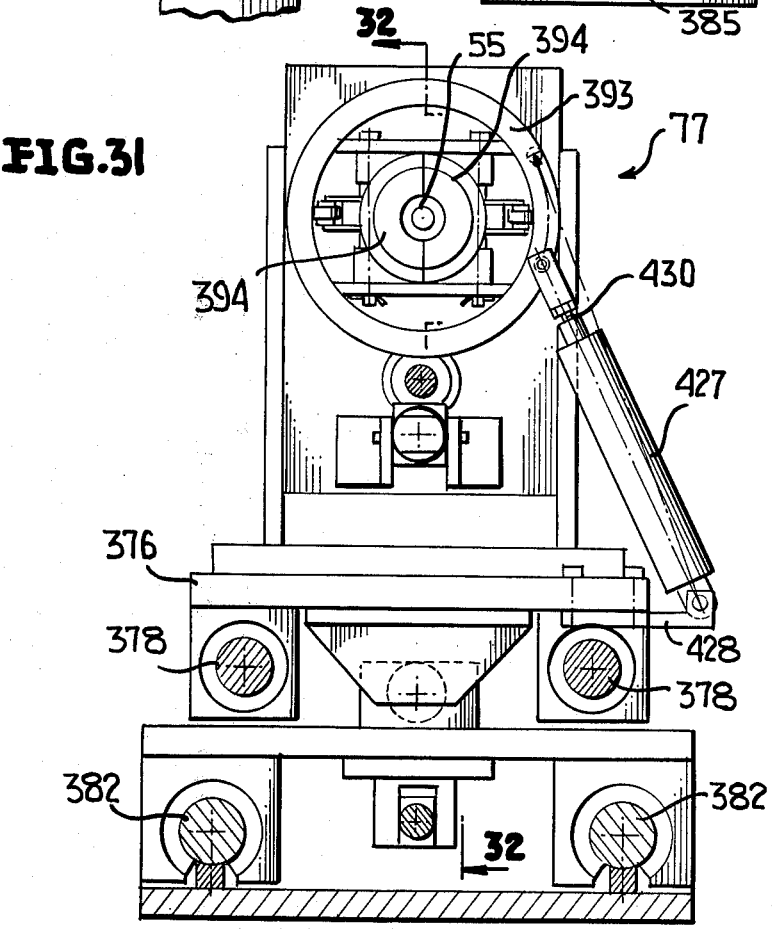
FIG. 31 is a transverse vertical sectional view taken generally along the line 31—31 of FIG. 28, and shows the specific mounting of the strand engaging head of the strand compressor and doffer.

In order to smooth the trailing end of the casing strand 83, it is desirable to effect rotation of the frustoconical surface 426 relative to the casing strand. It is for this reason that the rotating head 393 was rotatably mounted in the support 375. The rotatable head 393 is oscillated by means of an extensible drive member 427 in the form of a fluid cylinder which has one end thereof anchored relative to the carriage 376 by means of a bracket 428 and has the piston rod 430 thereof coupled to the rotatable head 393. This is best shown in FIG. 31. If desired, the rotatable head 393 could be rotated by a suitable small motor (not shown) drivingly, as opposed to being oscillated, connected to the rotatable head 393.

Figure 29:
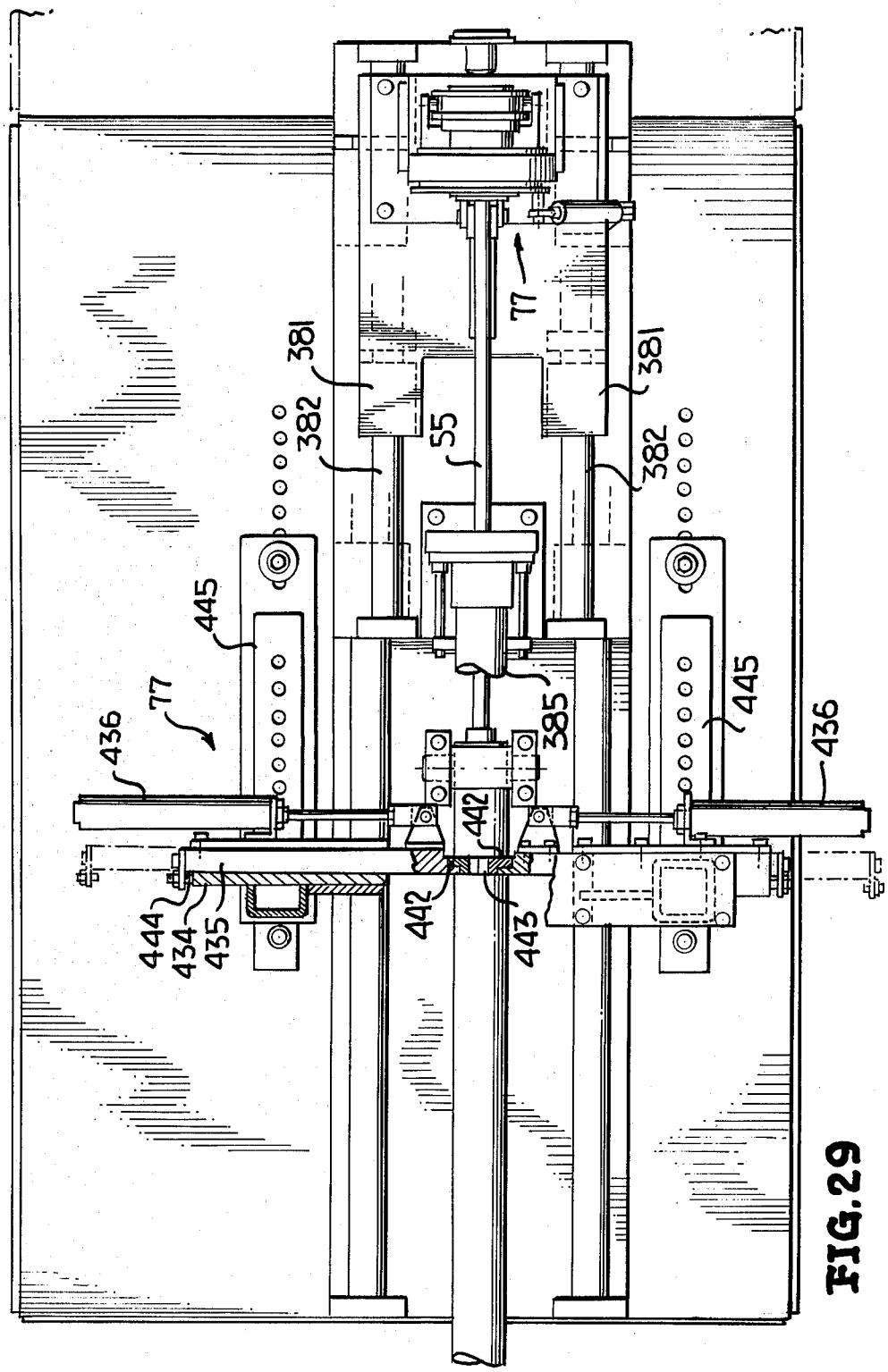
FIG. 29 is a plan view of the strand compressor and doffer of FIG. 28.
Figure 30:
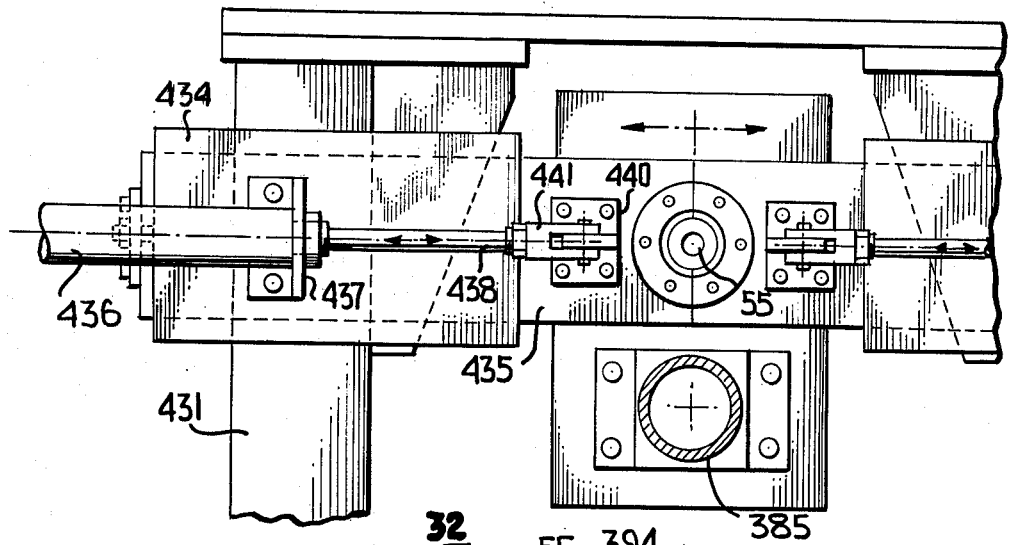
FIG. 30 is an enlarged fragmentary transverse sectional view taken generally along the line 30—30 of FIG. 28, and shows the details of the strand stop mechanism.

Reference is now made to FIGS. 28-30 wherein the details of the stop unit 78 are best shown. First of all, the base 374 has extending upwardly therefrom two supports 431 which are coupled at their upper ends by a tie plate 432 and which are braced by braces 433. Each support 431 carries a guide structure 434 in which there is mounted a slide 435 for transverse movement. Each slide has coupled thereto an extensible drive member 436 in the form of a fluid cylinder which is carried by a bracket 437 mounted on the guide 434. A piston rod 438 of the fluid cylinder is attached to the slide 435 by means of a bracket 440 and a fitting 441.

Each slide 435 is provided with a face plate half insert 442 with the halves combining to define an aperture 443 of a size snugly to receive the mandrel 55. The face plate halves 442 are preferably formed of a plastic material which will not damage the end of the casing strand 83 when compressed thereagainst.

In order to assure that when the slides are in their closed positions the aperture 443 is centered on the mandrel 55, each slide 435, as is best shown in FIG. 29, is provided with an adjustable stop member 444 engageable with the outer end of the respective guide 434.

Inasmuch as the travel of the head 77 is controlled, in order that strands may be compressed to different selected lengths, each support 431 and its brace 433 is mounted on a base 445 which has numerous selected positions on the base 374.

With the head 77 in a downstream position, a casing strand 83 is delivered through the open jaws 394, after which the head 77 returns to its starting position of FIG. 32. The cylinder 411 is then actuated to close the jaws. At this time the stop mechanism 78 has been actuated to move the face halves 442 to their closed position of FIG. 29. The cylinder 385 is now actuated to move the head 77 to the phantom line position of FIG. 28 and the strand disposed between the head 77 and the stop mechanism 78 is compressed to the desired length. During the movement of the head 77 from its retracted position to the strand compressing position, the cylinder 427 is repeatedly actuated to oscillate the rotatable head 393 and thereby refurnish the trailing end of the shirred strand 83.

The stop unit 78 is then opened and the cylinder 387 is actuated further to advance the compressed strand 83 along the mandrel 55 to a position where it is received by the strand handler 57. The strand handler will then, in a manner which is no way forms a part of this invention, move the strand into engagement with the end closer to close the leading end of the strand 83 in the known manner.

After the strand has been doffed, the cylinder 387 is de-energized, permitting the head 77 to move back through the stop unit 78. The stop unit 78 is then returned to its closed position and the strand compressor and doffer 56 is ready to receive the next strand.

Reference is now made to FIG. 1B where there is illustrated the transporter 58. The transporter 58 includes a guide track 446 which is suitably mounted above other mechanisms of the machine. Below the guide track 446 is a feed screw 447 and below the feed screw 447 is a pair of guide members 448. The guide track, the feed screw and the guide members are all carried at their opposite ends by upstanding supports 450, 451.

The feed screw 447 is selectively driven by means of a quick change gear box 452 which is driven by way of a motor 453.

A carriage 454 is mounted for guided movement along the guide members 448 and has the upper portion thereof engaged with the guide track 446. An intermediate portion of the carriage 454 is meshed with the feed screw 447 to be driven thereby.

The carriage 454 carries an extensible motor of which only an actuating rod 455 is shown. The rod 455 is coupled to a carrier 456 which, in turn, carries the transporter gripper 84. It is to be noted that the gripper 84 is normally positioned above the path of the separator 82 and has a back position behind the position to which the separator 82 moves a separated strand. After a strand has been separated, the gripper 84 is moved down over the mandrel 55 behind the separated strand for transporting the same in the previously described manner.

Referring once again to FIG. 1B and FIG. 2B, it will be seen that the base 374 has suitably mounted thereon a conventional cam actuated switch unit 457. The switch unit 457 includes a cam shaft 458 which carries a sprocket 460 which is aligned with a sprocket 461 on the control shaft 60. The sprockets 460, 461 are drivingly connected by a drive belt or chain 462 so that the cam shaft 458 is driven in timed relation to the rotation of the control shaft 60.

It is to be understood that the cam controlled switch mechanism 457 has plural switches which will control air valves or other control devices necessary for the actuation of various components of the invention. Thus the control shaft 60 not only provides proper control of various components by way of direct drive and cams, but by controlling the actuation of various control switches.

Although only a single cam actuated switch control device has been illustrated, it is to be understood that there may be several of such devices in accordance with the requirements of the machine.

Referring now to FIG. 35, it will be seen that there is schematically illustrated only the base section of the machine with parts broken away. As previously described, the machine includes a control shaft 60 which may be of a sectional construction. As illustrated in FIG. 35, the control shaft 60 includes a main section 60A which is supported in two bearings 463 and is suitably driven by a drive unit 103. The shaft section 60A extends into the adjoining base 106 from the base 107 and it is joined to a next shaft section 60B by a shaft coupler 464. The base 106 has a single bearing assembly 463 as do the remaining bases of the machine. This is clearly evidenced by FIG. 35.

Referring now to FIGS. 36 and 37, it will be seen that a typical shaft coupling 464 includes one shaft section, for example the shaft section 60A, having a half-circular cross sectional projection 465 which overlaps a similar but longer half-circular sectional projection 466. By properly machining the projections 465, 466, it will be seen that the shaft sections 60A and 60B will be of a preselected angular relationship.

The two shaft sections 60A, 60B are rigidly joined together by a clamp unit 467 which includes a sleeve 468 having a first portion 470 of a diameter to fit over the shaft section 60A and a second portion 471 of a much greater diameter. A clamp mechanism 472, which is a purchased item, is disposed within the portion 471 of the sleeve and in transverse alignment with the overlapped portion 465, 466.

The clamp device 472 includes inner and outer split rings 473, 474 each of which has double switching surfaces. Between the sleeves 473, 474 are two wedge rings 475, 476, one of which carries at regular circumferentially spaced intervals bolts 477 and the other of which has a threaded portion 478 for receiving the threaded ends of the bolts.

As will be readily apparent, with the bolts 477 loosened, the clamp unit 472 is loose both within the sleeve 468 and about the shaft sections. The clamp assembly 467 is slid to the position illustrated in FIG. 36, the shaft sections 60A, 60B are then arranged in abutted relationship, after which the bolts 477 are tightened down. The net result is that the diagonal mating faces 480 and 481 of the projections 465, 466 are tightly clamped together so as to interlock the shaft sections 60A, 60B against radial displacement. The clamp unit also serves to clamp the shaft sections againt axial displacement although there is very light axial load tending to separate the shaft sections.

It is to be understood that the mandrel 55 is to be supplied air under pressure in the mandrel supporting clamps 75 and 76. Also, the mandrel is to be supplied a liquid which may be of a lubricating or softening nature. Finally, while the mandrel will be supported not only in the supporting clamps 75, 76, but also by other portions of the machine, there is a tendency first of all for the mandrel to rotate when the casing is spun and also to move axially. It is therefore necessary that the supporting clamps 75, 76 form seals with the mandrel, but also that the mandrel be mechanically interlocked with at least one of the support clamp assemblies. To this end, the clamps are of a special construction as will be apparent with reference to FIGS. 38-42. For purposes of identification only, the clamps are identified by the reference numerals 315 and 316 and are shown as being carried by slides 314.

The clamp 316, in the illustrated embodiment, is of the simplest construction and is provided only with means for forming a seal with the exterior of the mandrel 55 about an entrance port therein. For identification purposes only, it is to be understood that the clamp 316 will supply air under pressure to the mandrel.

As is clearly shown in FIG. 40, the clamp 316 is provided with an air supply passage 479 which has opening thereinto a further supply passage 479 which has an internally threaded outer portion 482 for receiving a tube fitting. It will also be seen from FIG. 38 that the clamp 316 has a clamping face 482 with a part circular cross-sectional, longitudinally extending recess 484 therein. The supply passage 479 is directed toward the recess 484 and terminates in a large diameter bore 485 which opens through the clamp 316 into the recess 484.

As is customary, a resilient sleeve 486 is positioned within the bore 485. However, in prior installations, when the projecting end of the sleeve 486 compressively engages the mandrel 55, there has been an inward deformation of the sleeve restricting the cross section of the bore 487 therethrough. Further, after the sleeve has been installed and operated for a period of time, the sleeve has a tendency to stick within the bore 485.

The deficiencies of the prior sleeve mountings has been cured in what is believed to be a very simple manner. A headed pin, generally identified by the numeral 488, is telescoped within the sleeve 486 from the inner end thereof, as is shown in FIG. 40. The pin 488 includes an internally threaded tubular portion 490 with a flat head 491. The bore of the tubular portion 490 extends through the flat head 491 and permits flow of the compressed air, or liquid as the case may be, from the supply passage 479 through the sleeve 496 in the conventional manner. However, when the jaws 315, 316 are tightly closed about the mandrel 55 and the outer end of the resilient sleeve 486 is compressed, the tubular portion 490 of the pin will prevent the customary internal collapse of the sleeve.

When it is desired to remove the sealing sleeve 486 and replace it with another, it is merely necessary to thread a removing tool 492 into a threaded bore of the tube portion 490 and then use the pin 488 to remove the resilient sleeve 486 as is schematicaly illustrated in FIG. 40.

Referring now to FIG. 39, it will be seen that the clamp 315 also has a supply passage 493 corresponding to the supply passage 480 and that the passage 493 opens into a large diameter bore 494 having positioned therein a sealing sleeve 495 which is of the same construction as the sealing sleeve 486 and which is provided with a pin 488. The sealing sleeve 495 will supply the second of the fluids to the mandrel 55.

The clamp 315 is also provided with the customary mandrel positioning pin which engages in a bore in the mandrel 55 to form an interlock therewith. However, in accordance with this invention, there is an improved pin arrangement which not only facilitates the accurate positioning of the pin but also ease of replacement.

First of all, there is formed in the clamp face of the clamp 315 in alignment with a mandrel receiving recess 496 a relatively large diameter internally threaded bore 497. The bore 497 has threaded therein a member 498 which may well be a customary set screw. One end of the set screw is provided with a tool receiving socket 500 in the customary manner. The set screw 498 is provided with a bore 501 of a diameter generally corresponding to the distance between flats of the socket 500. This bore 501 extends only partially through the set screw and terminates in a reduced diameter bore 502 for receiving an end portion of the pin.

As is best shown in FIG. 42, the pin, which is identified by the numeral 503, preferably has a large diameter central portion 504 and two reduced diameter end portions 505. The diameter of the central portion 504 is such so as to provide a relatively tight fit within the bore 501 to assure proper positioning of the pin. The proportions of the pin 503 are such that the reduced diameter end portion 505 projects into the recess 496 the desired preselected amount. The opposite reduced diameter pin portion 505 is received in the bore 502 so that the pin 503 may be reversed when one end portion becomes damaged.

It will be readily apparent how the set screw or member 498 may be installed. It will also be readily apparent how the pin 503 may be installed. However, difficulties would normally be experienced in removing the pin. However, the bore 497 has a continuous bore or passage arrangement which opens through the exterior of the clamp 315 in a passage 506 of a preselected conventional diameter. When it is desired to remove the pin 503, with reference to FIG. 40, the passage 506 is filled with a suitable fluid such as oil, and then a pin 507 is driven therein with the pin 507 functioning as a piston to pump the fluid through the passage 506 against the inner end of the pin 503 so as to expel the pin.

Referring now to FIGS. 43-46, there is illustrated a modified form of gripper-separator unit generally identified by the numeral 510. The unit 510 includes a gripper 512 and a separator 514. The gripper or hold back device 512 will be carried by suitable mounting brackets, such as the mounting brackets 250, 251, which will be carried by guide rods 252 and 253 as described with respect to the hold back device 81. In a like manner, the separator 514 will be carried by a mounting bracket such as the mounting bracket 233 for the separator 82, the mounting bracket being mounted on guide rods 234.

Referring now to FIG. 44, it will be seen that the gripper 512 includes a support member 516 which is secured to the mounting brackets 250, 251 and which carries a rotatable member 518 which is journalled on an internal sleeve member 520 by way of bearings 522. The rotatable member 518 is provided with a toothed sprocket 524 so as to be rotatable by way of a drive belt in a manner disclosed with respect to the gripper 81.

Unlike the gripper 81, which has only three blades, the gripper 512 has four blades 526 which are integral with carrier portions 528 that are mounted in a pair of guideways 530 seated in a recess 532 in a front face of the member 518.

Each blade 526 is actuated by an extensible motor which, in the illustrated embodiment of the invention, is in the form of a fluid cylinder arrangement 534. Each fluid cylinder arrangement 534 includes a cylinder 536 having a piston 538 mounted therein. Each piston is provided with a piston rod 540 which has a bifurcated inner end, as is best shown in FIG. 15. A pin 542 extends transversely of the bifurcation and pivotally mounts an intermediate portion of a lever 544. The lever 544 has one rounded end 546 positioned in a notch 548 in the member 518 and a second rounded end 550 positioned in a notch 552 in the support portion 528. It will be seen that for a unit travel of the piston rod 540 there will be double the movement of the blade 526.

The cylinders 536 will all receive air or other actuating fluid by way of a fitting 554 and through a rotary joint 556.

Referring once again to FIG. 46, it will be seen that the pivot pin 542 extends well beyond the piston rod 540 and has the remote ends thereof aligned with bores 558 in the member 518 alongside the cylinder 536. Each of the bores 558 has a tension spring 560 positioned therein with the inner end of each tension spring being interlocked with a respective end of the pivot pin 542 and the outer end of each tension spring being retained in place by a pin 562.

It is to be understood that the separator 514 will be of an identical construction to that of the gripper 512 as far as the mounting of the blades, etc., is concerned. However, for identification purposes the blades of the separator will be identified by the numeral 564.

As is best shown in FIG. 44, when there are four blades 526 and four blades 564, it is not possible that the blades interlock and be exactly in the same plane. However, by tapering the blades 526 and 564 and having the edges of the blades immediately adjacent one another, it will be seen that the blades may grip a shirred casing either in the same fold or in immediately adjacent folds so that the unit 510 may function in the same manner as the unit 53. It is to be understood that the gripper 512 and the separator 514 will be driven by the shaft 214 to rotate in unison and with any apparatus which may be used to spin the shirred casing.

Reference is now made to FIGS. 47–52 wherein there is illustrated still another form of gripper-separator unit, generally identified by the numeral 570. The unit 570 includes a gripper 572 and a separator 574.

Referring first to FIG. 47, it will be seen that the gripper 572 is carried by the mounting brackets 250, 251 which are slidably mounted on the guide rods 252, 253. In a like manner, as is shown in FIG. 19, the separator 574 is mounted on the mounting bracket 233 which is guidingly mounted on the guide rod 234.

The gripper 572 includes a back plate 575 which carries at three circumferentially spaced points angle brackets 576. One of the angle brackets 576 is fixedly secured to the bracket 250, as is best shown in FIG. 47, and mounts the back plate for movement with the brackets 250, 251.

The back plate 575 carries a rotatable member 577 by way of bearings 578. The rotatable member 577, in turn, carries three sets of blades 580, the supports therefor, and the actuators therefor. Only one blade 580 will be specifically described here.

The blade 580 slopes downwardly and inwardly, as is clearly shown in FIG. 48, and is carried by a support 581 which, in turn, is carried by a guide member 582 which is mounted in a guideway 583 formed in the rotatable member 577.

The blade 580 is positioned by means of a rack 584 which is mounted by the guide member 582. The rack 584 is driven by means of a pinion 585 which is mounted on a shaft 586 and meshed with a rack 587. The rack 587 is mounted for axial movement on a guide 588 which, in turn, is mounted in a guideway 590 defined by a guide element 591 carried by the rotatable member 577.

A cam ring 592 extends around the exterior of the member 577 and has adjacent one end thereof an annular groove 593 which opens radially inwardly and has positioned therein cam followers 594, there being one cam follower 594 for each of the racks 587 with the cam follower being carried by a respective guide member 588.

The cam ring 592 is provided with circumferentially spaced cam slots 595 which are of a sloping configuration, as is best shown in FIG. 45. Each cam slot 595 has positioned therein a cam follower 596 which is carried by one of the angle brackets 576, as is best shown in FIGS. 44 and 45. It thus will be apparent that when the cam ring 592 is rotated relative to the back plate 575, it will be shifted axially and thus the cam followers 594 will shift the racks 597 axially so as to rotate the pinions 585 and shift the racks 584 and the associated blades 580 downwardly and inwardly so as to engage and grip shirred casing carried by the mandrel 55.

In order to effect the rotation of the cam ring 592, there is provided an extensible motor 597 having an actuating rod 598 which is secured to a projection 600 carried by the ram ring 592, the projection 600 has a ball and socket coupling 601 with the actuating rod 598. As is best shown in FIG. 47, the extensible motor 597 is carried by a bracket 602 which, in turn, is carried by one of the angle brackets 576.

Reference is now made to FIGS. 50–52 with respect to the separator 574. The separator 574 also carries three blades 603 which slope downwardly and inwardly parallel to the blades 580. Further, the blades 603 are intended to be intermeshed with the blades 580 so that the tips of the blades 580 and 603, in their projected casing engaging positions, will lie in a common plane.

As is best shown in FIG. 51, the separator 574 includes a fixed back plate 604 which, in turn, carries a fixed outer ring 605. A rotatable member 606 is rotatably journalled within the ring 605 by way of bearings 607. The rotatable member 606 has formed therein a guideway 608 with respect to each of the blades 603 and has mounted therein a guide member 610 which carries a bracket 611 mounting a respective blade 603. The guide member 610 carries a rack 612 which meshes with a pinion 613 mounted on a shaft 614. The pinion 613, in turn, meshes with a rack 615 carried by a guide member 616 which is also guidingly engaged in guideways 617 formed in the rotatable member 606.

A cam ring 618 generally extends around the ring 605 and has a radially outwardly opening annular cam groove 620 in which there is positioned a cam follower 621 carried by each of the guide members 616. The cam ring 618 also has formed therein circumferentially spaced cam grooves 622 which are of a sloping configuration as is best shown in FIG. 52. In each cam groove 622 there is a cam follower 623 which is fixedly carried by the ring 605.

Referring once again to FIG. 50, it will be seen that the cam ring 618 is provided with a radially outwardly directed fitting 624 which is coupled by way of a ball and socket fitting 625 to an actuator rod 626 of an extensible motor (not shown), which motor will be of a construction similar to the motor 597 and which will be mounted on a suitable bracket (not shown) fixedly secured to the mounting bracket 233.

It is to be understood that the gripper 572 and the separator 574 will be rotated in unison. The means for accomplishing this will be described in more detail hereinafter.

Referring now once again to FIG. 48, it will be seen that the back plate 575 carries an inner sleeve 627 which is provided at its left end with a face tooth drive connection 628 with the rotatable member 577. The sleeve 627 is guided within a sleeve 630 carried by the face plate 572.

The sleeve 627 carries a clutch body 631 which is provided with a plurality of guide pins 632 on which there is mounted for axial movement a clutch element 633 having an exposed clutch face 634 at the right end thereof. The clutch element is constantly urged to the right by compression springs 635 mounted on the guide pins 632.

In order that the projection of the clutch element 633 to the right from the clutch body 621 may be limited, there is provided at least one, and preferably several, scissor linkages generally identified by the numeral 636. Each scissor linkage includes a pair of cooperating links 637 and 638 mounted on pivot pins 640 and 641 carried by the clutch body and the clutch element, respectively. The links 637, 638 are pivotally connected by a pivot pin 642. The link 638 carries adjacent the pivot pin 642 a stop projection 643 which limits the pivoting of the links in an opening direction thus to limit the movement of the clutch element 633 to the right.

The combined density control and casing spinning device 74 or any other device which serves to spin the casing and is disposed next to the gripper 572 is used to rotate the gripper 572 at the same speed and in the same direction as the shirred casing is being spun. To this end, the device 74 or like device is provided with a drive plate 644 which carries a dlutch facing 645 which opposes the face 634 of the clutch element 633.

When a shirred casing is to be gripped and separated into an individual strand, the gripper 572 is retracted to the right to its casing gripping position, at which time the face 634 engages the clutch facing 645 and serves to rotate the inner sleeve 627 and thus the rotatable member 577 and the blades 580 carried thereby. The gripper continues to spin with the casing and at the same rate as the spinning of the casing until after a strand has been separated even though the gripper moves axially with the spinning casing a short distance. It will be seen that the provided for movement of the clutch element 633 permits the gripper to move on the order of one inch while it is still being driven by the clutch facing 645.

Inasmuch as the blades 580 and 603 intermesh and are disposed in circumferentially alternating relation, it is necessary that the separator 574 also be rotated in unison with the gripper 572. Accordingly, suitable means must be provided for rotating the separator in unison with the gripper.

While any desired coupling may be provided, in accordance with this invention the clutch body 631 may be provided with a toothed sprocket 646 which will be coupled to a drive sprocket 647 by way of a belt 648 in the same manner as that described with respect to the hold back device or gripper 81. The sprocket 647 will be mounted for rotation in a suitable bracket 650 carried by the back plate 575 and will have a square opening therein to carry a square drive shaft 651. It is to be understood that the drive shaft 651 will be longitudinally fixed relative to the sprocket 647.

In a like manner, the rotatable member 606 may be provided with a toothed drive sprocket 652 which will be driven by a drive belt 653 (FIG. 50) which engages a drive sprocket 654 mounted in a suitable bracket 655 carried by the back plate 604. The sprocket 605 will have a square opening therethrough and will have the square drive shaft 651 extending therethrough. It is to be understood that the shaft 651 will be of a sufficient length to permit the independent movement of the separator 674 relative to the gripper 572 to effect the separation of shirred casing into a strand and to move the strand along the mandrel 55 a sufficient distance for engagement by a transporter.

It is to be understood that the gripper 572 and the separator 574 will be axially moved in the manner described hereinabove with respect to the gripper 81 and the separator 82.

Referring once again to FIGS. 5 and 6, it will be seen that the positioning of all of the fingers 260 simultaneously may be effected by means of a timing disc 660. The timing disk 660 is annular in outline and is provided with a series of arcuate cam slots 661, there being one cam slot for each of the fingers 260. A follower member 662 in the form of a shoulder bolt extends through each cam slot 661 and is engaged in the respective finger 260.

It will be apparent that when the fingers 260 are advanced or retracted, the disc 660 will rotate and will either be held up or cause the fingers to move in the desired direction, thereby providing for a uniform movement of the various fingers 260.

Although only the hold back device or gripper 81 has been illustrated with the timing disc 660, it is to be understood that the timing disc may equally as well be utilized in connection with the separator 82 and the gripper 512 and the separator 514.

We claim:

1. A machine for continuously shirring and spinning a casing for sausage and the like, said machine comprising an elongated mandrel, feed means for advancing a casing along said mandrel at a selected rate, shirring means for continuously shirring the fed casing, spinning means for continuously spinning the continuously shirred casing, and density control means for continuously controlling the advance of the shirred casing, and separating means for separating the continuously shirred and continuously spinning casing into strands of preselected lengths downstream of said spinning means.

2. A machine according to claim 1 together with a transporter for sequentially transporting separated strands along said mandrel, and a combined compressing and doffing means disposed along said mandrel for receiving a strand from said transporter and first axially compressing the strand and then doffing the strand.

3. A machine according to claim 1 together with further density control means disposed downstream of said separator means for engaging a continuously advancing shirred casing prior to separation.

4. A machine according to claim 1 together with drive means for rotating said spinning means and said separating means about said mandrel in unison.

5. A machine according to claim 3 wherein there are axially spaced mandrel supports between said separating means and said combined compressing and doffing means, said mandrel supports being selectively openable, and said transport means has drive means operable to receive a separated casing strand and to move said separated casing strand in step-by-step movements completely first through one of said mandrel supports and then through the other of said mandrel supports to said combined compressing and doffing means.

6. A machine according to claim 3 wherein there are axially spaced mandrel supports between said separating means and said combined compressing and doffing means, said mandrel supports being selectively openable, further density control means disposed downstream of said separator means for engaging a continuously advancing shirred casing prior to separation, said further density control means being generally positioned between said mandrel supports and being operable through that mandrel clamp disposed adjacent said separating means.

7. A machine according to claim 1 wherein said density control means and said spinning means form a single combined unit fixed axially of said mandrel.

8. A machine according to claim 1 wherein said density control means includes drive means for continuously advancing a shirred casing along said mandrel, and said spinning means includes means for continuously rotating said drive means about said mandrel.

9. A machine according to claim 8 together with means for separately changing both the rate of advance of said drive means and the rate of rotation of said spinning means.

* * * * *